US012652546B1

(12) United States Patent
Zohoorian et al.

(10) Patent No.: US 12,652,546 B1
(45) Date of Patent: Jun. 9, 2026

(54) SYSTEMS AND METHODS OF DETERMINING FLOOR LOCATIONS OF DEPLOYED ACCESS POINTS

(71) Applicant: Juniper Networks, Inc., Sunnyvale, CA (US)

(72) Inventors: Mohammad Zohoorian, San Francisco, CA (US); Kevin Friday, Los Gatos, CA (US); Nagarjun Srinivasan, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 350 days.

(21) Appl. No.: 18/305,040

(22) Filed: Apr. 21, 2023

Related U.S. Application Data

(60) Provisional application No. 63/363,353, filed on Apr. 21, 2022.

(51) Int. Cl.
*H04W 16/18* (2009.01)
(52) U.S. Cl.
CPC .................................... *H04W 16/18* (2013.01)
(58) Field of Classification Search
CPC ..................................................... H04W 16/18
See application file for complete search history.

(56) References Cited

U.S. PATENT DOCUMENTS

| | | | |
|---|---|---|---|
| 9,729,439 | B2 | 8/2017 | MeLampy et al. |
| 9,729,682 | B2 | 8/2017 | Kumar et al. |

| | | | |
|---|---|---|---|
| 9,762,485 | B2 | 9/2017 | Kaplan et al. |
| 9,832,082 | B2 | 11/2017 | Dade et al. |
| 9,871,748 | B2 | 1/2018 | Gosselin et al. |
| 9,985,883 | B2 | 5/2018 | MeLampy et al. |
| 10,200,264 | B2 | 2/2019 | Menon et al. |
| 10,277,506 | B2 | 4/2019 | Timmons et al. |
| 10,432,522 | B2 | 10/2019 | Kaplan et al. |
| 10,756,983 | B2 | 8/2020 | Ratkovic et al. |
| 10,862,742 | B2 | 12/2020 | Singh |
| 10,958,537 | B2 | 3/2021 | Safavi |
| 10,958,585 | B2 | 3/2021 | Safavi |
| 10,985,969 | B2 | 4/2021 | Safavi |
| 10,992,543 | B1 | 4/2021 | Rachamadugu et al. |
| 11,350,288 | B1 * | 5/2022 | Dennis ................... H04W 16/20 |
| 2011/0086636 | A1 * | 4/2011 | Lin ....................... H04W 24/02 |
| | | | 455/434 |
| 2012/0129559 | A1 * | 5/2012 | Pochop, Jr. ........... H04W 24/02 |
| | | | 455/507 |
| 2016/0374012 | A1 * | 12/2016 | Prechner ............... H04W 64/00 |

(Continued)

FOREIGN PATENT DOCUMENTS

| | | | | |
|---|---|---|---|---|
| EP | | 3460405 A1 * | 3/2019 | ............ H04W 16/18 |

OTHER PUBLICATIONS

U.S. Appl. No. 17/303,222, filed May 24, 2021, naming inventors Safavi et al.

(Continued)

*Primary Examiner* — Charles T Shedrick
(74) *Attorney, Agent, or Firm* — Juniper Networks, Inc.

(57) ABSTRACT

A network management system (NMS) automatically determines floor information for group(s) of one or more deployed access points (APs) in a wireless network. The floor information may include, for example, a specific floor number of a multi-floor structure on which each of the group(s) of APs is installed.

18 Claims, 19 Drawing Sheets

(56)                References Cited

U.S. PATENT DOCUMENTS

| | | | |
|---|---|---|---|
| 2017/0094470 A1* | 3/2017 | Venkatraman ........ | H04W 4/025 |
| 2017/0134909 A1* | 5/2017 | Gu ........................ | H04W 4/029 |
| 2020/0403890 A1 | 12/2020 | McCulley et al. | |
| 2021/0239850 A1 | 8/2021 | Castagnoli et al. | |
| 2021/0243558 A1 | 8/2021 | Castagnoli et al. | |
| 2021/0282024 A1* | 9/2021 | Moreman ............. | H04W 64/00 |
| 2021/0306201 A1 | 9/2021 | Wang et al. | |
| 2022/0141673 A1* | 5/2022 | Flesch ................. | H04W 52/243 |
| | | | 370/329 |
| 2023/0080610 A1* | 3/2023 | Zohoorian ........... | H04W 24/02 |
| | | | 370/329 |
| 2023/0099699 A1* | 3/2023 | Han ....................... | G01R 33/24 |
| | | | 455/456.1 |
| 2023/0171561 A1* | 6/2023 | Zohoorian ........... | H04W 4/026 |
| | | | 455/456.5 |

OTHER PUBLICATIONS

U.S. Appl. No. 17/651,526, filed Feb. 17, 2022, naming inventor Zohoorian.
U.S. Appl. No. 63/243,616, filed Sep. 13, 2021, naming inventor Zohoorian.

\* cited by examiner

AP Group A

AP Group B

AP Group C

AP Group D

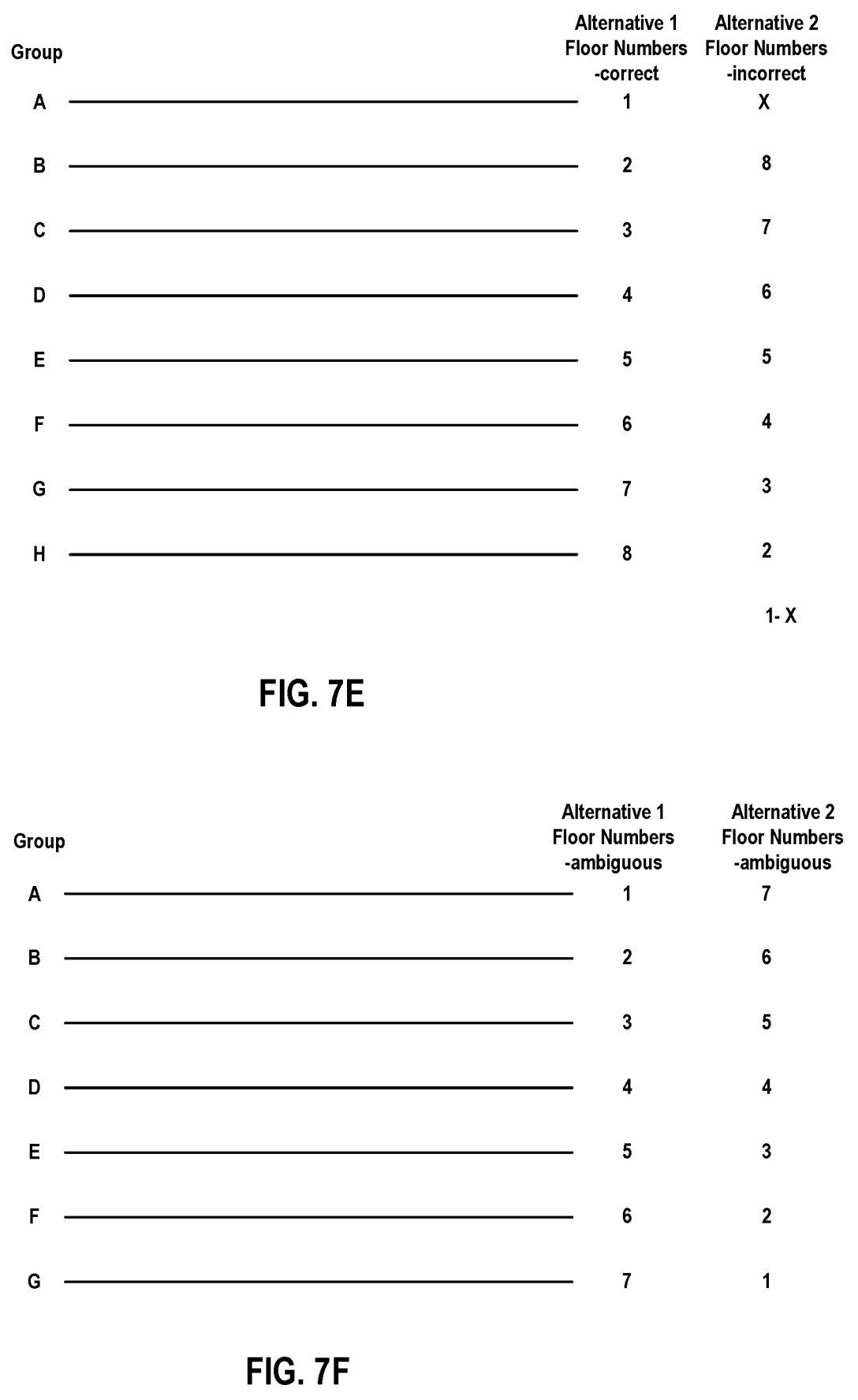

| Group | | Alternative 1 Floor Numbers -correct | Alternative 2 Floor Numbers -incorrect |
|---|---|---|---|
| A | ——————————— | 1 | X |
| B | ——————————— | 2 | 8 |
| C | ——————————— | 3 | 7 |
| D | ——————————— | 4 | 6 |
| E | ——————————— | 5 | 5 |
| F | ——————————— | 6 | 4 |
| G | ——————————— | 7 | 3 |
| H | ——————————— | 8 | 2 |
| | | | 1- X |

FIG. 7E

| Group | | Alternative 1 Floor Numbers -ambiguous | Alternative 2 Floor Numbers -ambiguous |
|---|---|---|---|
| A | ——————————— | 1 | 7 |
| B | ——————————— | 2 | 6 |
| C | ——————————— | 3 | 5 |
| D | ——————————— | 4 | 4 |
| E | ——————————— | 5 | 3 |
| F | ——————————— | 6 | 2 |
| G | ——————————— | 7 | 1 |

SYSTEMS AND METHODS OF DETERMINING FLOOR LOCATIONS OF DEPLOYED ACCESS POINTS

CROSS-REFERENCE TO RELATED APPLICATION

This application claims the benefit of U.S. Provisional Patent Application No. 63/363,353, filed Apr. 21, 2022, which is incorporated by reference herein in its entirety.

FIELD

The disclosure relates generally to computer networks and, more specifically, to automated deployment and provisioning of wireless networks.

BACKGROUND

Commercial premises, such as offices, hospitals, airports, stadiums, or retail outlets, often include a network of wireless access points (APs) installed throughout the premises to provide wireless network services to one or more wireless client devices. APs enable client devices to wirelessly connect to a wired network using various wireless networking protocols and technologies, such as wireless local area networking protocols conforming to one or more of the IEEE 802.11 standards (i.e., "Wi-Fi"), Bluetooth/Bluetooth Low Energy (BLE), mesh networking protocols such as ZigBee or other wireless networking technologies. Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible wireless access point in order to access a wired network. Location services that may be provided in conjunction with a wireless network include wayfinding, location-based proximity notifications, asset tracking, and location-based analytics that derive insights from client mobility through the premises.

SUMMARY

In general, the disclosure describes techniques for automatically determining floor information for group(s) of one or more deployed access points (APs) in a wireless network. The floor information may include, for example, a specific floor number of a multi-floor structure on which the group of APs is installed. Wi-Fi systems are often deployed in high-rise or other buildings spanning multiple floors. When Wi-Fi systems are deployed in such environments, multiple groups of technicians may install a plurality of APs on the various floors to provide one or more wireless networks throughout the multi-floor structure. During the installation, the installers may group one or more APs installed on the same floor of the multi-floor structure and enter a list of APs belonging to each group into a database. In some scenarios, the installers do not enter the specific floor numbers on which the one or more groups of APs were installed. This can lead to situations in which one or more APs that were installed on the same floor number of the multi-floor structure are grouped together in the database, but uncertainty remains (e.g., in the network database) about the specific floor number on which each group of APs was installed.

In accordance with one or more techniques of the disclosure, a network management system (NMS) automatically determines floor information for group(s) of one or more deployed APs in a wireless network. The floor information for each group of APs may include, for example, a specific floor number of a multi-floor structure on which the group of APs is installed. The NMS determines the floor information for each group of APs based on estimated distances between the groups APs. In some examples, the NMS estimates a distance between a first group of APs and a second group of APs based on distance measurements between at least one AP in the first group of APs and at least one AP in the second group of APs and x, y coordinate locations of the at least one AP in the first group of APs and the at least one AP in the second group of APs. The distance measurements may include, for example, round-trip-time (RTT) and/or received signal strength indicator (RSSI) based distance measurements between the at least one AP in the first group of APs and the at least one AP in the second group of APs.

The techniques of the disclosure provide one or more technical advantages and practical applications. For example, automatic determination of floor information for group(s) of one or more deployed access points (APs) can reduce costs and increase efficiency as compared to the time-consuming and error-prone manual process of setting up a wireless network. Significant labor savings can be realized as technicians need not manually determine and enter floor information for each individual AP into a database at the time of installation. The techniques also facilitate automated and remote verification and/or correction of floor information, thus reducing the need to dispatch technicians to conduct periodic manual site surveys in order to keep the floor information up to date. The techniques further support more rapid and dynamic deployment and provisioning of wireless networks by automatically detecting when an AP has been removed, one or more APs have been moved to a different floor of the multi-floor structure, or a new AP has been installed, e.g., as a replacement for a faulty AP or to provide additional wireless coverage. Automatic determination of floor information for group(s) of APs further supports the provision of highly precise indoor location-based services at a site, which depend upon accurate knowledge of the floor number on which each AP is installed. Targeted information can thus be provided to wireless devices based on their real-time or near real-time geographic location in multi-floor indoor and/or outdoor environments. Automatic determination of floor information for group(s) of APs may further be used for RF coverage optimization and radio resource management of the APs at the site, such as channel and transmit power level selection, thus supporting optimization of network performance and improving the overall user experience of the wireless network.

In one example, the disclosure is directed to a system comprising: a plurality of access point devices (APs) configured to provide a wireless network at a site, wherein the site includes a multi-floor structure; and a network management system comprising: one or more processors; and a memory comprising instructions that when executed by the one or more processors cause the one or more processors to: estimate, for each group of APs of a plurality of groups of APs, a distance between the group of APs and at least two other groups of APs of the plurality of groups of APs, wherein each group of APs includes one or more APs of the plurality of APs that are deployed on a same floor of the multi-floor structure; determine, based on the estimated distances, a relative order of the plurality of groups of APs; and assign, based on the relative order of the plurality of groups of APs, a floor number of a plurality of floor numbers of the multi-floor structure to each group of APs of the plurality of groups of APs.

In another example, the disclosure describes a method comprising: estimating, by the computing device, for each group of access point devices (AP) of a plurality of groups of APs, a distance between the group of APs and at least two other groups of APs of the plurality of groups of APs; determining, by the computing device and based on the estimated distances, a relative order of the plurality of groups of APs; and assigning, by the computing device and based on the relative order of the plurality of groups of APs, a floor number of a plurality of floor numbers of the multi-floor structure to each group of APs of the plurality of groups of APs.

In another example, the disclosure describes to a non-transitory computer readable medium comprising instructions that when executed by one or more processors cause the one or more processors to: estimate, for each group of access point devices (APs) of a plurality of groups of APs, a distance between the group of APs and at least two other groups of APs of the plurality of groups of APs, wherein each group of APs includes one or more APs deployed on a same floor of a multi-floor structure; determine, based on the estimated distances, a relative order of the plurality of groups of APs; and assign, based on the relative order of the plurality of groups of APs, a floor number of a plurality of floor numbers of the multi-floor structure to each one of the plurality of groups of APs.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIGS. 7A-7F are conceptual diagrams illustrating determination of floor information for group(s) of APs, in accordance with one or more techniques of the disclosure.

DETAILED DESCRIPTION

Figure 1A:
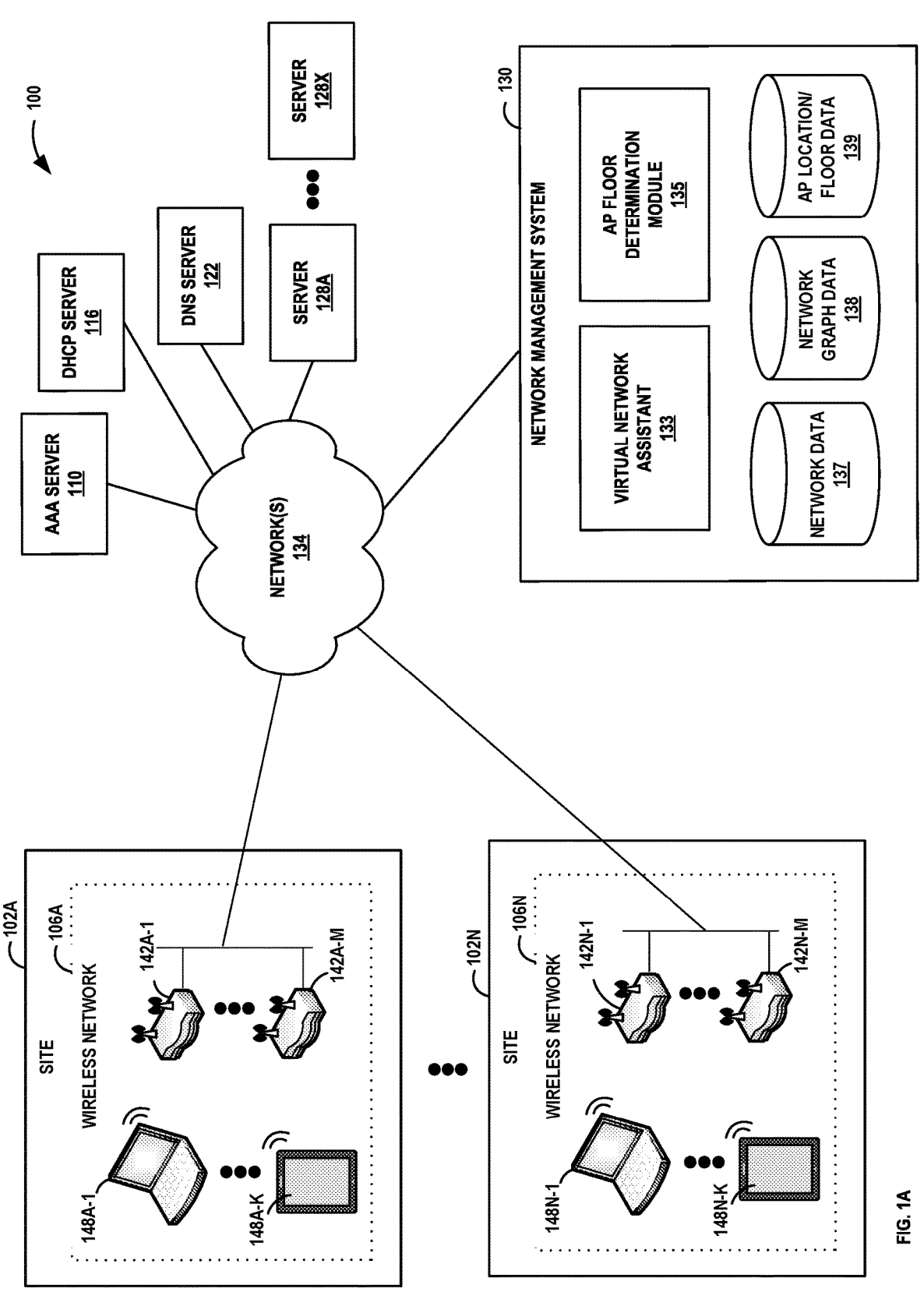
FIG. 1A is a diagram of an example network system 100 that determines floor information for group(s) of one or more deployed access points (APs), in accordance with one or more techniques of the disclosure.

FIG. 1A is a diagram of an example network system 100 in which a network management system (NMS) 130 automatically determines floor information for group(s) of one or more deployed access points (APs) in a wireless network. The floor information for each group of APs may include, for example, a specific floor number of a multi-floor structure on which the group of APs is installed. Example network system 100 includes a plurality sites 102A-102N (collectively referred to herein as "sites 102") at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect. In addition, although the examples will be described herein with respect to determining floor(s) on which group(s) of APs are installed (also referred to herein as "floor information" for each group of APs), the techniques described herein may also be applied to determining floor information for any type of computing devices in a wired or wireless network.

Sites 102, such as enterprises, offices, hospitals, airports, stadiums, or retail outlets, often install complex wireless network systems, including a network of wireless access point (AP) devices, e.g., AP devices 142, throughout the premises to provide wireless network services to one or more wireless client devices. In this example, site 102A includes a plurality of AP devices 142A-1 through 142A-M. Similarly, site 102N includes a plurality of AP devices 142N-1 through 142N-M. Each AP device 142 may be any type of wireless access point, including, but not limited to, a commercial or enterprise access point, a router, or any other device capable of providing wireless network access. For purposes of the present disclosure, a plurality of APs 142 are deployed on multiple floors of a building or other structure to establish a wireless network at a site 102.

Each site 102A-102N also includes a plurality of client devices, otherwise known as user equipment devices (UEs), referred to generally as client devices 148 or UEs 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smartphone, tablet or laptop computer, a personal digital assistant (PDA), a wireless terminal, a smart watch, smart ring or other wearable device. UEs 148 may also include IoT client devices such as printers, security devices, environmental sensors, appliances, or any other device configured to communicate over one or more wireless networks.

Example network system 100 also includes various networking components for providing networking services within the wired network including, as examples, an Authentication, Authorization and Accounting (AAA) server 110 for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128 (e.g., web servers, databases servers, file servers and the like), and a network management system (NMS) 130. As shown in FIG. 1A, the various devices and systems of network 100 are coupled together via one or more network(s) 134, e.g., the Internet and/or an enterprise intranet. Each one of the servers 110, 116, 122 and/or 128, AP devices 142, UEs 148, NMS 130, and any other servers or devices attached to or forming part of network system 100 may include a system log or an error log module wherein each one of these devices records the status of the device including normal operational status and/or error conditions.

In the example of FIG. 1A, NMS 130 is a cloud-based computing platform that manages wireless networks 106A-106N at one or more of sites 102A-102N. As further described herein, NMS 130 provides an integrated suite of wireless network management tools and implements various techniques of the disclosure.

NMS 130 monitors network data associated with wireless networks 106A-106N at each site 102A-102N, respectively, to deliver a high-quality wireless network experience to end users, IoT devices, and clients at the site. The network data may include a plurality of states or parameters indicative of one or more aspects of wireless network performance. The data may be ingested form numerous sources, including client devices, APs, switches, firewalls, etc. The network data may be stored in a database, such as network data 137 within NMS 130 or, alternatively, in an external database. In general, NMS 130 may provide a cloud-based platform for network data acquisition, monitoring, activity logging, reporting, predictive analytics, network anomaly identification, and alert generation. In some examples, NMS 130 uses a combination of artificial intelligence, machine learning, and data science techniques to optimize user experiences and simplify operations across any one or more of wireless access, wired access, and SD-WAN domains.

NMS 130 observes, collects and/or receives network data 137 for a variety of client devices, such as SDK clients, named assets, and/or client devices connected/unconnected to the wireless network. The network data is indicative of one or more aspects of wireless network performance. Network data 137 may take the form of data extracted from messages, counters, and statistics, for example. The network data may be collected and/or measured by one or more UEs 148 and/or one or more AP devices 142 in a wireless network 106. Some of the network data 137 may be collected and/or measured by other devices in the network system 100, such as switches or firewalls. In accordance with one specific implementation, NMS 130 includes at least one computing device or processor. In accordance with other implementations, NMS 130 may comprise one or more distributed computing devices, processors, dedicated servers, virtual machines, containers, services, or other forms of environments for performing the techniques described herein.

NMS 130 may include a virtual network assistant (VNA) 133 that analyzes network data received from one or more UEs 148 and/or one or more AP devices 142 in a wireless network, provides real-time insights and simplified troubleshooting for IT operations, and automatically takes remedial action or provides recommendations to proactively address wireless network issues. VNA 133 may, for example, include a network data processing platform configured to process hundreds or thousands of concurrent streams of network data from UEs 148, sensors and/or agents associated with AP devices 142, and/or nodes within network 134. For example, VNA 133 of NMS 130 may include a network performance engine that automatically determines one or more service level expectation (SLE) metrics for each user equipment device 148 in a wireless network 106. SLE metrics determined based on the collected network data can be used to measure various aspects of wireless network performance. SLE metrics seek to measure and understand network performance from the viewpoint of the end user experience on the network. One example SLE metric is a coverage metric, which tracks the number of user minutes that a client's device received signal strength indicator (RSSI) as measured by an access point with which the client is associated is below a configurable threshold. Another example SLE metric is a roaming metric, which tracks a client's percentage of successful roams between two access points that are within prescribed latency (e.g., time-based) thresholds. Other example SLE metrics may include time to connect, throughput, successful connects, capacity, AP health, and/or any other metric that may be indicative of one or more aspects of wireless network performance. The SLE metrics may also include parameters such as an RSSI of a received wireless signal as measured by the client device, a signal-to-noise ratio (SNR) of the wireless signal as measured by the client device, etc. The thresholds may be customized and configured by the wireless network service provider to define service level expectations at the site. The network service provider may further implement systems that automatically identify the root cause(s) of any SLE metrics that do not satisfy the thresholds, and/or that automatically implement one or more remedial actions in response to or to address the root cause, thus automatically improving wireless network performance.

VNA 133 may also include an underlying analytics and network error identification engine and alerting system. VNA 133 may further provide real-time alerting and reporting to notify administrators or IT personnel of any predicted events, anomalies, trends, and may perform root cause analysis and automated or assisted error remediation.

In some examples, VNA 133 of NMS 130 may apply machine learning techniques to identify the root cause of error conditions or poor wireless network performance metrics detected or predicted from the streams of event data. VNA 133 may generate a notification indicative of the root cause and/or one or more remedial actions that may be taken to address the root cause of the error conditions or poor wireless network performance metrics. In some examples, if the root cause may be automatically resolved, VNA 133 invokes one or more remedial or mitigating actions to address the root cause of the error condition or poor wireless network performance metrics, thus automatically improving the underlying wireless network performance metrics (e.g., one or more SLE metrics) and also automatically improving the user experience of the wireless network.

Computational resources and components implementing VNA 133 may be part of the NMS 130, may execute on other servers or execution environments, or may be distributed to nodes within network 134 (e.g., routers, switches, controllers, gateways and the like). Example details of these and other operations implemented by the VNA 133 and/or NMS 130 are described in U.S. application Ser. No. 14/788,489, filed Jun. 30, 2015, and entitled "Monitoring Wireless Access Point Events," U.S. application Ser. No. 16/835,757, filed Mar. 31, 2020, and entitled "Network System Fault Resolution Using a Machine Learning Model," U.S. application Ser. No. 16/279,243, filed Feb. 19, 2019, and entitled "Systems and Methods for a Virtual Network Assistant," U.S. application Ser. No. 16/237,677, filed Dec. 31, 2018, and entitled "Methods and Apparatus for Facilitating Fault Detection and/or Predictive Fault Detection," U.S. application Ser. No. 16/251,942, filed Jan. 18, 2019, and entitled "Method for Spatio-Temporal Modeling," U.S. application Ser. No. 16/296,902, filed Mar. 8, 2019, and entitled "Method for Conveying AP Error Codes Over BLE Advertisements," and U.S. application Ser. No. 17/303,222, filed May 24, 2021, and entitled, "Virtual Network Assistant Having Proactive Analytics and Correlation Engine Using Unsupervised ML Model," each of which is incorporated by reference herein in its entirety.

In accordance with the techniques described in this disclosure, NMS 130 includes an AP floor determination module 135 that is configured to automatically determine floor information for group(s) of one or more deployed APs in a wireless network. A plurality of APs are deployed (e.g., installed) on a plurality of floors of a multi-floor building or structure to establish a wireless network at a site. The plurality of APs are assigned to groups of one or more APs (also referred to herein as groups of APs). Each group of APs includes one or more deployed APs installed on the same floor number of the multi-floor structure; however, at the time of installation neither the specific floor number of the multi-floor structure associated with each group nor the order (e.g., the order or sequence of the groups from the lowest floor number to the highest floor number) of the groups/floors is known. The floor information is automatically determined by AP floor determination module 135 for each group of APs and may include a specific floor number of the plurality of floor numbers on which the group of APs is installed.

AP location module 135 may store the resulting floor information for each group of APs in a database or other storage media, such as AP location/floor data 139, for further monitoring and/or analysis. In addition, NMS 130 may automatically generate one or more notifications and/or automatically invoke one or more actions based on the floor information determined for the group(s) of APs. In another example, the determined floor information for the group(s) of APs may be used to provide location services for client devices associated with the wireless network.

Figure 1B:
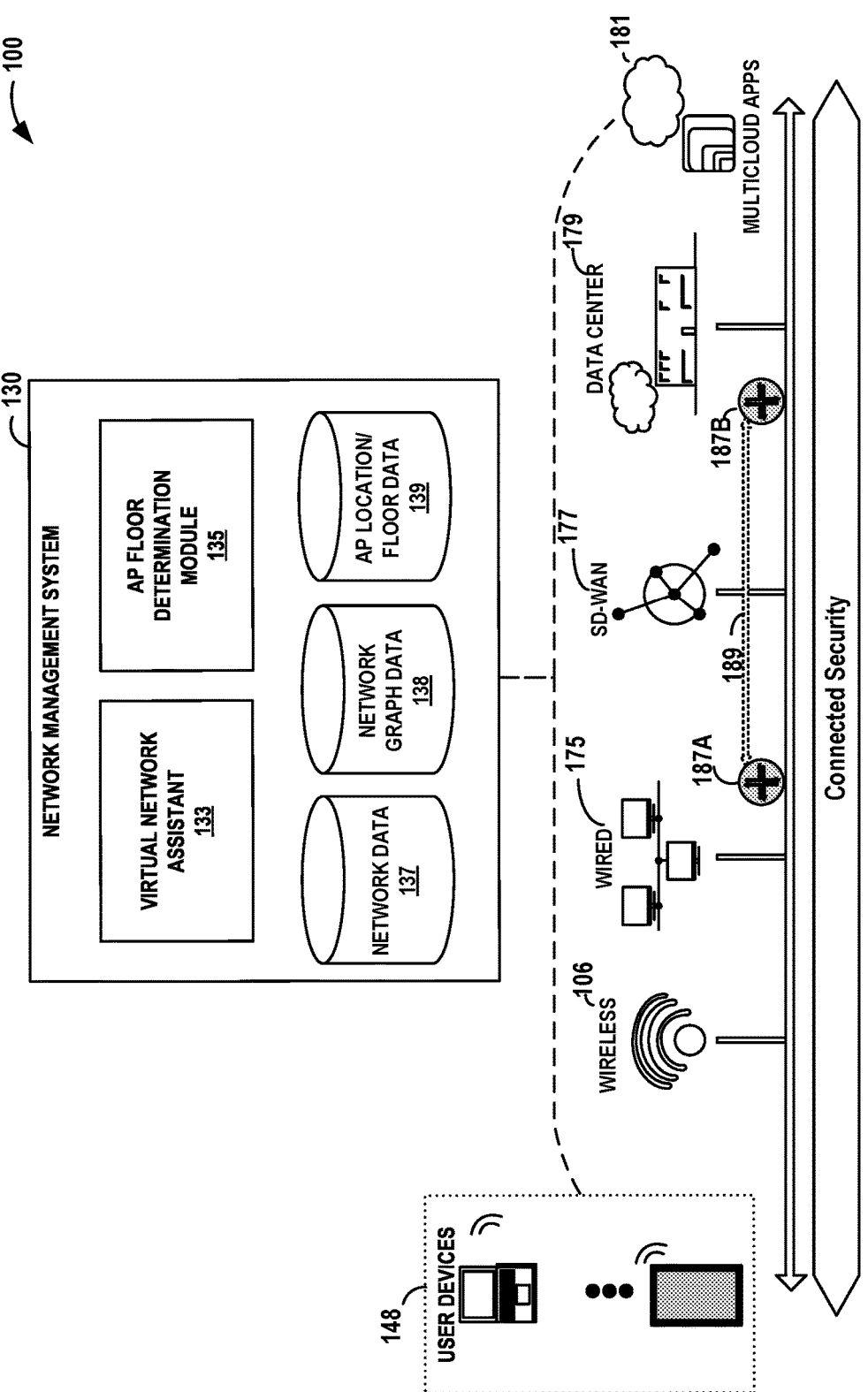
FIG. 1B is a block diagram illustrating further example details of the network system of FIG. 1A.

FIG. 1B is a block diagram illustrating further example details of the network system of FIG. 1A. In this example, FIG. 1B illustrates NMS 130 configured to operate according to an artificial intelligence/machine-learning-based computing platform providing comprehensive automation, insight, and assurance (Wi-Fi Assurance, Wired Assurance and WAN assurance) spanning from wireless network 106 and wired LAN 175 networks at the network edge (far left of FIG. 1B) to cloud-based application services 181 hosted by computing resources within data centers 179 (far right of FIG. 1B). NMS 130 includes a virtual network assistant 133, AP floor determination module 135, network data 137, network graph data 138 and AP location data 139.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, network management system 130 may be configured to proactively monitor and adaptively configure network 100 so as to provide self-driving capabilities. Moreover, VNA 133 includes a natural language processing engine to provide AI-driven support and troubleshooting, anomaly detection, AI-driven location services, and AI-drive RF optimization with reinforcement learning.

As illustrated in the example of FIG. 1B, AI-driven NMS 130 also provides configuration management, monitoring and automated oversight of software defined wide-area network (SD-WAN) 177, which operates as an intermediate network communicatively coupling wireless networks 106 and wired LANs 175 to data centers 179 and application services 181. In general, SD-WAN 177 provides seamless, secure, traffic-engineered connectivity between "spoke" routers 187A of edge wired networks 175 hosting wireless networks 106, such as branch or campus networks, to "hub" routers 187B further up the cloud stack toward cloud-based application services 181. SD-WAN 177 often operates and manages an overlay network on an underlying physical Wide-Area Network (WAN), which provides connectivity to geographically separate customer networks. In other words, SD-WAN 177 extends Software-Defined Networking (SDN) capabilities to a WAN and allows network(s) to decouple underlying physical network infrastructure from virtualized network infrastructure and applications such that the networks may be configured and managed in a flexible and scalable manner.

In some examples, underlying routers of SD-WAN 177 may implement a stateful, session-based routing scheme in which the routers 187A, 187B dynamically modify contents of original packet headers sourced by user devices 148 to steer traffic along selected paths, e.g., path 189, toward application services 181 without requiring use of tunnels and/or additional labels. In this way, routers 187A, 187B may be more efficient and scalable for large networks since the use of tunnel-less, session-based routing may enable routers 187A, 187B to achieve considerable network resources by obviating the need to perform encapsulation and decapsulation at tunnel endpoints. Moreover, in some examples, each router 187A, 187B may independently perform path selection and traffic engineering to control packet flows associated with each session without requiring use of a centralized SDN controller for path selection and label distribution. In some examples, routers 187A, 187B implement session-based routing as Secure Vector Routing (SVR), provided by Juniper Networks, Inc.

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, each of which is incorporated by reference herein in its entirety.

In some examples, AI-driven NMS 130 may enable intent-based configuration and management of network system 100, including enabling construction, presentation, and execution of intent-driven workflows for configuring and managing devices associated with wireless networks 106, wired LAN networks 175, and/or SD-WAN 177. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is incorporated by reference herein in its entirety.

Figure 2:
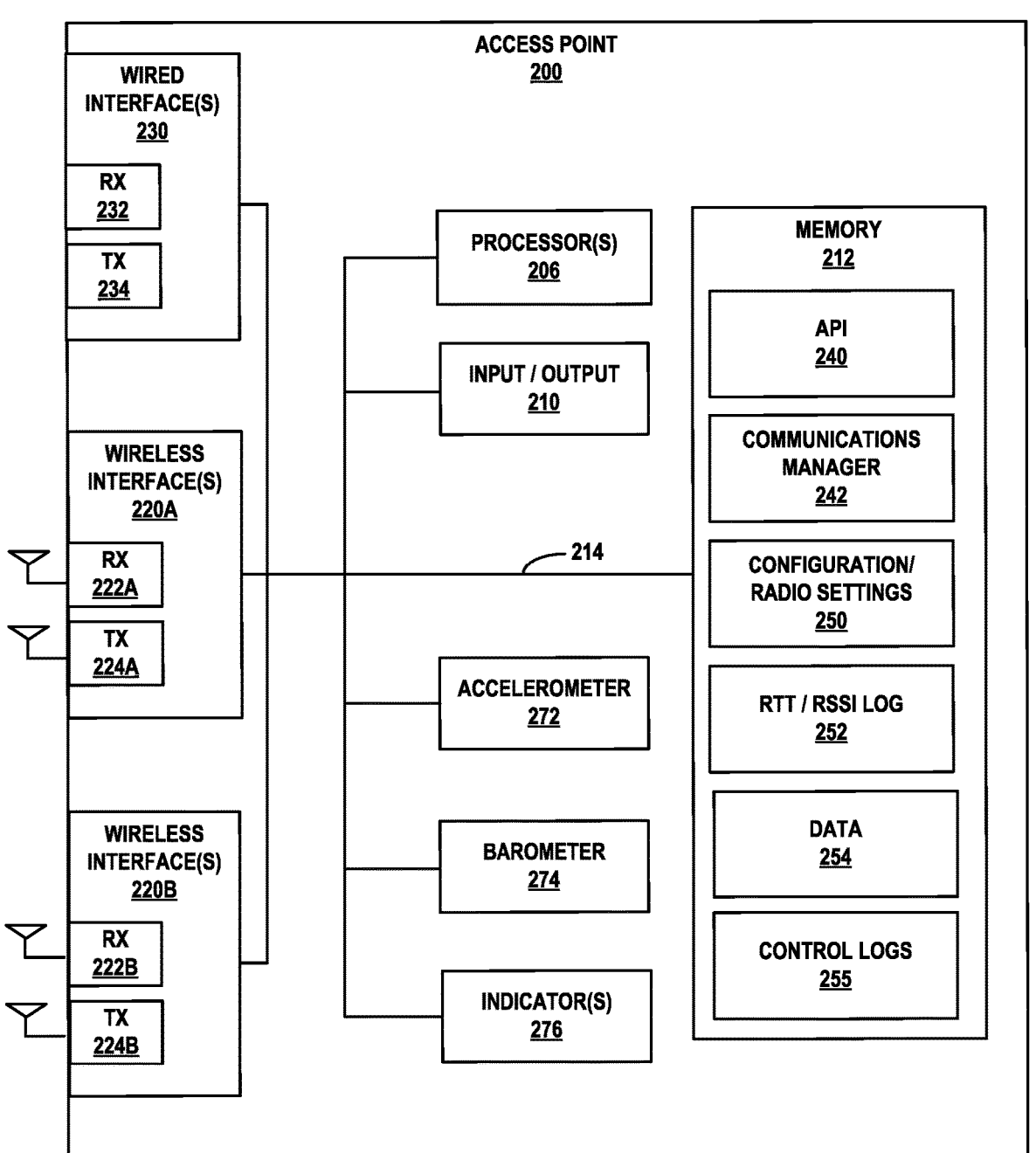
FIG. 2 is a block diagram of an example access point device, in accordance with one or more techniques of the disclosure.

FIG. 2 is a block diagram of an example access point (AP) device 200 configured in accordance with one or more techniques of the disclosure. Example access point 200 shown in FIG. 2 may be used to implement any of AP devices 142 as shown and described herein with respect to FIG. 1A. Access point device 200 may comprise, for example, a Wi-Fi, Bluetooth and/or Bluetooth Low Energy (BLE) base station or any other type of wireless access point.

In the example of FIG. 2, access point device 200 includes a wired interface 230, wireless interfaces 220A-220B, one or more processor(s) 206, memory 212, and user interface 210, an accelerometer 272, a barometer 274 and one or more indicators 276 coupled together via a bus 214 over which the various elements may exchange data and information. Wired interface 230 represents a physical network interface and includes a receiver 232 and a transmitter 234 for sending and receiving network communications, e.g., packets. Wired interface 230 couples, either directly or indirectly, access point device 200 to network(s) 134 of FIG. 1A. First and second wireless interfaces 220A and 220B represent wireless network interfaces and include receivers 222A and 222B, respectively, each including a receive antenna via which access point 200 may receive wireless signals from wireless communications devices, such as UEs 148 of FIG. 1A. First and second wireless interfaces 220A and 220B further include transmitters 224A and 224B, respectively, each including transmit antennas via which access point 200 may transmit wireless signals to wireless communications devices, such as UEs 148 of FIG. 1A. In some examples, first wireless interface 220A may include a Wi-Fi 802.11 interface (e.g., 2.4 GHz, 5 GHz, 6 GHz, or other wireless communication frequency) and second wireless interface 220B may include a Bluetooth interface and/or a Bluetooth Low Energy (BLE) interface. One or both of wireless interfaces(s) 220 may include an array of transmit and/or receive antennas. However, the above are given for example purposes only, and the disclosure is not limited in this respect.

Processor(s) 206 are programmable hardware-based processors configured to execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 206 to perform one or more of the techniques described herein.

Memory 212 includes one or more devices configured to store programming modules and/or data associated with operation of access point device 200. For example, memory 212 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 206 to perform one or more of the techniques described herein.

In this example, memory 212 stores executable software and various data including an application programming interface (API) 240, a communications manager 242, configuration settings 250, RTT/RSSI log 252, data storage 254, and control log 255. RTT/RSSI log 252 includes RTT values and/or RSSI values measured by AP 200 with respect to one or more other APs in the wireless network. Although example RTT and RSSI techniques are described herein, it shall be understood that any method of estimating distances between two APs may be used, including any type of Wi-Fi ranging technique, and the disclosure is not limited in this respect.

The RTT and/or RSSI value(s) may be used to estimate a distance between two AP(s). For example, AP 200 may measure the RSSI values of received wireless signals transmitted by one or more other APs and store the measured value in RTT/RSSI log 252. The RSSI values may then be used by AP 200, NMS 130, or both, to estimate a distance between AP 200 and the one or more other APs in the wireless network. As another example, AP 200 and one or more other APs may perform round trip time (RTT) (e.g., time-of-flight (ToF)) measurements between each other and store the measured values in their respective RTT/RSSI log

252. RTT techniques may then be used by AP 200, NMS 130, or both, to estimate the distance between the two APs. Example Wi-Fi RTT techniques are described by the IEEE 802.11mc (i.e., IEEE 802.11-2016) standard, which defines a fine-time measurement (FTM) protocol that can be used to measure the Wi-Fi signal round trip time (RTT). In some examples, AP 200 sends the RTT/RSSI values to NMS 130, and NMS 130 estimates a distance between AP 200 and one or more other APs based on the received RTT/RSSI values received from each of the plurality of APs. In other examples, each AP 200 estimates the distance between itself and one or more other APs in the wireless network based on the RTT or RSSI values, and transmits the estimated distances to NMS 130. The estimated distances between APs may also be determined by any other computing device, and the disclosure is not limited in this respect. In accordance with one or more techniques of the disclosure, NMS 130 estimates a distance between a first group of APs and a second group of APs based at least in part on the estimated distance between at least one AP in the first group of APs and at least one AP in the second group of APs.

Network data stored in data storage 254 may include, for example, data concerning or associated with AP events and/or UE events. In some examples, the network events are classified as positive network events, neutral network events, and/or negative network events. The network events may include, for example, memory status, reboot events, crash events, Ethernet port status, upgrade failure events, firmware upgrade events, configuration changes, authentication events, DNS events, DHCP events, one or more types of roaming events, one or more types of proximity events, etc., as well as a time and date stamp for each event. Control logs 255 determines a logging level for the device based on instructions from NMS 130. Data 254 may store any data used and/or generated by access point device 200, including data collected from UEs 148.

Communications manager 242 includes program code that, when executed by processor(s) 206, allow access point 200 to communicate with UEs 148 and/or network(s) 134 via any of interface(s) 230 and/or 220A-220B. Configuration settings 250 include any device settings for access point 200 such as radio settings for each of wireless interface(s) 220A-220B. These settings may be configured manually or may be remotely monitored and/or automatically managed or configured by NMS 130 to optimize wireless network performance on a periodic (e.g., hourly or daily) basis.

Input/output (I/O) 210 represents physical hardware components that enable interaction with a user, such as buttons, a touchscreen, a display and the like. Although not shown, memory 212 typically stores executable software for controlling a user interface with respect to input received via I/O 210.

In some examples, rather than the NMS 130 (or some other computing device) determining the floor information for each group of APs, one or more of the APs 142 themselves may be configured to determine the floor information for one or more of the groups of APs and/or automatically execute other functionality based on the determined floor information.

Indicator(s) 276 include, for example, one or more multi-color LEDs used to visibly communicate a status of the AP. For example, AP 200 is configured to control indicator(s) 276 to blink out codes comprised of one or more colors or patterns to indicate the status of the AP 200. The codes may include one or more normal status codes (e.g., AP powering up, AP booting, AP connecting to cloud, at least one wireless client connected to AP, AP upgrading, AP locate mode, etc.)

and/or one or more error status codes (e.g., insufficient power, no Ethernet link, one or more DHCP errors, one or more DNS errors, one or more cloud unreachable errors, one or more tunneling protocol errors, one or more boot configuration errors, one or more firmware errors, etc.).

Indicator(s) 276 are positioned on one side (e.g., a top surface) of the AP and provide visual confirmation to the installer of the proper orientation of the AP during the installation process. For example, when the AP is deployed in a typical ceiling mounted configuration, indicator 276 should be visible to the installer and thus face generally downwards toward the floor rather than toward the ceiling. Likewise, when the AP is deployed in a floor mounted configuration, indicator 276 should face generally upwards toward the ceiling, whereas in a wall mounted configuration the indicator will face generally to the side. Indicator(s) 276 therefore increase consistency of installation by helping to ensure that all APs installed on the ceiling are installed in the same orientation with the indicator facing down and that all APs installed on the floor are installed with the indicator facing up. Indicator(s) 276 are thus one mechanism by which the system can rely on an assumption that APs installed on the ceiling are correctly oriented with the indicator facing down and the APs installed on the floor are oriented with the indicator facing up. Indicators 276 are also useful for purposes of troubleshooting deployed AP(s) and/or for purposes of locating a specific AP.

Accelerometer 272 includes, for example, a three-axis accelerometer that generates directional data indicative of an AP mounting configuration (e.g., whether the AP is mounted on one of a ceiling, a wall, or a floor). For example, accelerometer 272 may generate x, y, and z-axis accelerometer data characteristic of one or more AP mounting configurations, such as ceiling mount, a wall mount, and a floor mount. Example x, y, z-axis accelerometer readings indicative of ceiling mount, floor mount, and wall mount are shown in Table 1 below. However, depending upon the orientation of the accelerometer in the AP and/or how the reference axes of the accelerometer are defined, different characteristic accelerometer readings for each of the different mounting options may be obtained, and the disclosure is not limited in this respect:

TABLE 1

| Axis | AP facing down (ceiling mount) | AP facing up (floor mount) | AP facing side (wall mount) |
|---|---|---|---|
| X | −0.036 (0.00) | −0.28 (0.00) | 0.988 (1.00) |
| Y | 0.024 (0.00) | 0.02 (0.00) | 0.024 (0.00) |
| Z | 1.016 (1.00) | −1.024 (−1.00) | −0.028 (0.00) |

In this example, when the AP accelerometer data includes an x-component close to 0, a y-component close to 0, and a z-component close to 1, the AP is installed in a typical ceiling mount configuration. When the AP accelerometer data includes an x-component close to 0, a y-component close to 0, and a z-component close to −1, the AP is installed in a floor mount configuration. When the AP accelerometer data includes an x-component close to 1, a y-component close to 0, and a z-component close to 0, the AP is installed in a wall mount configuration.

In accordance with one or more techniques of the disclosure, AP accelerometer data may be used in some examples to distinguish between APs deployed in a ceiling mount configuration on one floor of a multi-floor structure and APs deployed in a floor mount configuration on a floor immediate above. In some examples, a distance between APs mounted on a ceiling of one floor of the multi-floor structure and APs mounted on a floor of the floor immediately above may be close enough that the floor-mounted AP may be mistakenly assigned to the wrong floor number, e.g., to the floor number immediately below the floor number where it is actually mounted. In such examples, AP accelerometer data may be used to verify and/or reassign floor number assignments for APs mounted in floor and/or wall-mount configurations.

Barometer 274 senses barometric pressure data in the environment at which AP 200 is deployed. In general, barometric pressure data at a higher elevation is relatively lower than barometric pressure data at a lower elevation. Thus, in some examples, the barometric pressure data determined by barometer 274 of AP 200 may be used to verify floor assignments of the group(s) of APs. For example, barometric pressure data obtained by APs assigned to a relatively higher floor number of a multi-floor structure may be compared with barometric pressure data obtained by one or more APs assigned to a relatively lower floor number of the multi-floor structure. If the barometric pressure data obtained by APs assigned to a relatively higher floor number of a multi-floor structure are relatively lower than the barometric pressure data obtained by one or more APs assigned to a relatively lower floor number of the multi-floor structure, the barometric pressure data can be used to verify that the floor assignments are correct. If the barometric pressure data obtained by APs assigned to a relatively higher floor number of a multi-floor structure are not relatively lower than the barometric pressure data obtained by one or more APs assigned to a relatively lower floor number of the multi-floor structure, the barometric pressure data can be used to verify that the floor assignments are not correct, or in some examples, the floor information may be used to determine that the barometric sensor is malfunctioning. In some examples, whether or not barometric pressure data can be used to verify the floor assignments depends upon the height of the multi-floor structure, the temperature of the environment, the precision of the barometer, etc. For example, the barometric pressure data may better reflect the accuracy of the floor assignments if the difference between a highest floor at which barometric pressure data is taken and a lowest floor at which a barometer reading is taken is large enough such that any difference(s) in the barometric pressure data is meaningful. In some examples, the barometric pressure measured by one or more APs in a group of APs can be averaged or otherwise aggregated to determine and/or confirm the floor number assigned to the group.

Figure 3A:
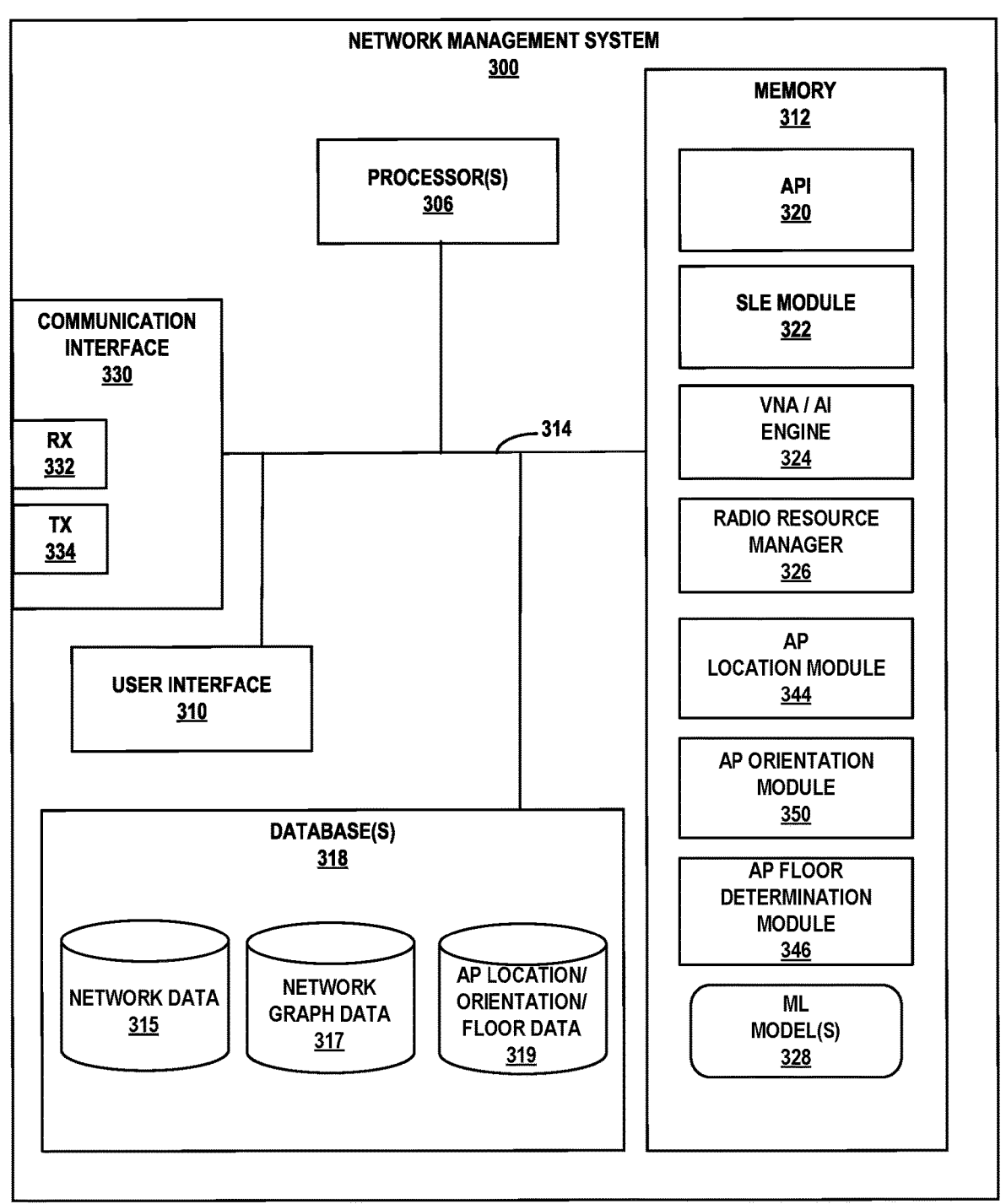
FIG. 3A is a block diagram of an example network management system configured to determine floor information for group(s) of one or more deployed access points (APs), in accordance with one or more techniques of the disclosure.

FIG. 3A is a block diagram of an example network management system (NMS) 300 configured to determine floor information for group(s) of APs, in accordance with one or more techniques of the disclosure. NMS 300 may be used to implement, for example, NMS 130 in FIGS. 1A-1B. In such examples, NMS 300 is responsible for monitoring and management of one or more wireless networks 106A-106N at sites 102A-102N, respectively, including determining the floor information for group(s) of APs 142. In some examples, NMS 300 receives network data collected by AP devices 142 from UEs 148, such as network data including proximity information used to determine one or more proximity assessments, and analyzes this data for cloud-based management of wireless networks 106A-106N. In some examples, NMS 300 may be part of another server shown in FIG. 1A or a part of any other server or computing device.

NMS 300 includes a communications interface 330, one or more processor(s) 306, a user interface 310, a memory 312, and a database 318. The various elements are coupled together via a bus 314 over which the various elements may exchange data and information.

Processor(s) 306 execute software instructions, such as those used to define a software or computer program, stored to a computer-readable storage medium (such as memory 320), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of AP devices 142, servers 110, 116, 122, 128, and/or any other devices or systems forming part of network 100 such as shown in FIGS. 1A-1B. The data and information received by NMS 300 may include, for example, network data and/or event log data received from access points 142 used by NMS 300 to remotely monitor and/or control the performance of wireless networks 106A-106N and to determine the locations, e.g., floor information, of APs 142. NMS may further transmit data via communications interface 330 to any of network devices such as APs 142 at any of network sites 102A-102N to remotely manage wireless networks 106A-106N.

Memory 312 includes one or more devices configured to store programming modules and/or data associated with operation of NMS 300. For example, memory 312 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, SLE module 322, a radio resource management (RRM) engine 326, a virtual network assistant (VNA)/AI engine 324, an AP location module 344, an AP orientation engine 350, an AP floor determination module 346, and one or more machine learning models 328. NMS 300 may also include any other programmed modules, software engines and/or interfaces configured for remote monitoring and management of wireless networks 106A-106N, including remote monitoring and management of any of AP devices 142.

RRM engine 326 monitors one or more metrics for each site 102A-102N in order to learn and optimize the power and/or radio-frequency (RF) environment at each site. For example, RRM engine 326 may monitor the coverage and capacity SLE metrics (e.g., managed by SLE module 322) for a wireless network 106 at a site 102 in order to identify potential issues with coverage and/or capacity in the wireless network 106 and to adjust the radio settings of the access points at each site to address the identified issues. RRM engine 326 may determine channel and transmit power distribution across all AP devices 142 in each network 106A-106N. RRM engine 326 may monitor events, power, channel, bandwidth, and number of clients connected to each AP device. RRM engine 326 may measure the strength of a radio signal of client devices, such as an RSSI value. RRM engine 326 may further automatically change or update configurations of one or more AP devices 142 at a site 102 with an aim to improve the coverage and/or capacity SLE metrics and thus to provide an improved wireless experience for the user. In some examples, RRM engine 326 may use information determined by AP location module 344, AP orientation engine 350 and/or AP floor determination module 346 in order to learn and optimize the RF environment provided by the wireless network.

VNA/AI engine 324 analyzes network data received from AP devices 142 as well as its own data to monitor performance of wireless networks 106A-106N. For example, VNA engine 324 may identify when anomalous or abnormal states are encountered in one of wireless networks 106A-106N. VNA/AI engine 324 may use a root cause analysis module (not shown) to identify the root cause of any anomalous or abnormal states. In some examples, the root cause analysis module utilizes artificial intelligence-based techniques to help identify the root cause of any poor SLE metric(s) at one or more of wireless networks 106A-106N. In addition, VNA/AI engine 324 may automatically invoke one or more remedial actions intended to address the identified root cause(s) of one or more poor SLE metrics. Examples of remedial actions that may be automatically invoked by VNA/AI engine 324 may include, but are not limited to, invoking RRM 326 to reboot one or more AP devices and/or adjust/modify the transmit power of a specific radio in a specific AP device, adding service set identifier (SSID) configuration to a specific AP device, changing channels on an AP device or a set of AP devices, etc. The remedial actions may further include restarting a switch and/or a router, invoke downloading of new software to an AP device, switch, or router, etc. These remedial actions are given for example purposes only, and the disclosure is not limited in this respect. If automatic remedial actions are not available or do not adequately resolve the root cause, VNA/AI engine 324 may proactively and automatically provide a notification including recommended remedial actions to be taken by IT personnel to address the anomalous or abnormal wireless network operation.

SLE module 322 enables set up and tracking of thresholds for one or more SLE metrics for each of wireless networks 106A-106N. SLE module 322 further analyzes network data (e.g., stored as network data 315) collected by AP devices and/or UEs associated with wireless networks 106A-106N, such as any of AP devices 142 from UEs 148 in each wireless network 106A-106N. For example, AP devices 142A-1 through 142A-M collect network data from UEs 148A-1 through 148A-K currently associated with wireless network 106A (e.g., named assets, connected/unconnected Wi-Fi clients). This data, in addition to any network data collected by one or more APs 142A-1 through 142A-M in wireless network 106A, is transmitted to NMS 300 and stored as, for example, network data 315.

NMS 300 executes SLE module 322 to determine one or more SLE metrics for each UE 148 associated with a wireless network 106. One or more of the SLE metrics may further be aggregated to each AP device at a site to gain insight into contribution of each AP device to wireless network performance at the site. The SLE metrics track whether the service level for each particular SLE metric meets the configured threshold value(s). In some examples, each SLE metric may further include one or more classifiers. If a metric does not meet the configured SLE threshold value for the site, the failure may be attributed to one of the classifiers to further understand how and/or why the failure occurred.

In this example, NMS 300 includes one or more modules or engines which, when executed by one or more processors of NMS 300, cause NMS 300 to automatically determine certain information concerning the deployment of the plurality of APs in the wireless network. For example, AP location module 344, when executed by one or more processor(s) of NMS 300, enables NMS 300 to automatically determine the x, y (and in some examples, z) coordinate locations of each AP at a site in a global coordinate system for the site. For purposes of the examples given in the present disclosure, the global coordinate system is a Cartesian coordinate system in which the x, y plane is defined by a horizontal plane substantially parallel to the floors and ceiling of a multi-floor building. The z-axis of the global coordinate system is defined as being perpendicular to the x-y plane. The origin of the global coordinate system is a defined fixed location at the site of the multi-floor structure. However, the global coordinate system may be defined in any other way, and the disclosure is not limited in this respect. For example, the global coordinate system may include a Cartesian coordinate system in which the x, y, and z-axes are defined in a different way with respect to the site. In other examples, the global coordinate system may include a spherical coordinate system, a latitude-longitude based coordinate system, or any other system in which the positions of one or more APs at a site may be uniquely identified.

Example techniques for automatic determination of x, y and/or z coordinates and/or location of one or more APs in a wireless network are described in U.S. Provisional Application No. 63/243,616, filed Sep. 13, 2021, and entitled, "Determining Locations of Deployed Access Points," U.S. patent application Ser. No. 16/915,447, filed Jun. 29, 2020, and entitled "Location Determination Based on Phase Differences," and U.S. patent application Ser. No. 16/915,381, filed Jun. 29, 2020, and entitled "Multi-Wireless Device Location Determination," each of which is incorporated by reference herein in its entirety. However, other techniques may also be used, and the disclosure is not limited in this respect. In addition or alternatively, the x, y and/or z coordinates of each AP may be manually entered for storage by the NMS 300 or in an associated database at the time of installation, as a result of a site survey, or at any other time.

AP orientation module 350, when executed by one or more processor(s) of NMS 300, enables NMS 300 to automatically determine the orientation of deployed APs in the global coordinate system for the site. For purposes of the present disclosure, the orientation angle of an AP is referred to as an angle, B, at which a fixed point on the AP is rotated with respect to the y-axis of the global coordinate system for the site. Example techniques for automatic determination of the orientation of one or more APs in a wireless network is described in U.S. patent application Ser. No. 17/651,526, filed Feb. 17, 2022, and entitled, "Determining Orientation of Deployed Access Points," and U.S. patent application Ser. No. 16/915,381, filed Jun. 29, 2020, and entitled "Multi-Wireless Device Location Determination," each of which is incorporated by reference herein in its entirety. However, other techniques may also be used, and the disclosure is not limited in this respect. In addition or alternatively, the orientation of each AP may be manually entered for storage by the NMS 300 or in an associated database at the time of installation, as a result of a site survey, or at any other time.

In accordance with one or more techniques of the disclosure, AP floor determination module 346, when executed by one or more processor(s) of NMS 300, enables NMS 300 to automatically determine floor information for group(s) of APs. Each group includes one or more APs installed on the same floor number of a multi-floor structure. The floor information determined by AP floor determination module

350 for each group of APs includes identification of a specific floor number of a plurality of floor numbers of the multi-floor structure on which the group of APs is installed.

NMS 300 may store the location/orientation/floor information for each of the plurality of APs and/or each group of APs in a database or other storage media, such as AP location/orientation/floor data 319, for further monitoring and/or analysis. In some examples, NMS 300 automatically generates one or more notifications and/or automatically invokes one or more actions based on the location(s), orientation(s), and/or floor information for one or more of the plurality of APs or groups of APs. In some examples, NMS 300 uses the location(s), orientation(s), and/or floor information stored or determined for one or more of the plurality of APs or groups of APs to provide location services for one or more client devices associated with the wireless network(s) at the site.

Figure 3B:
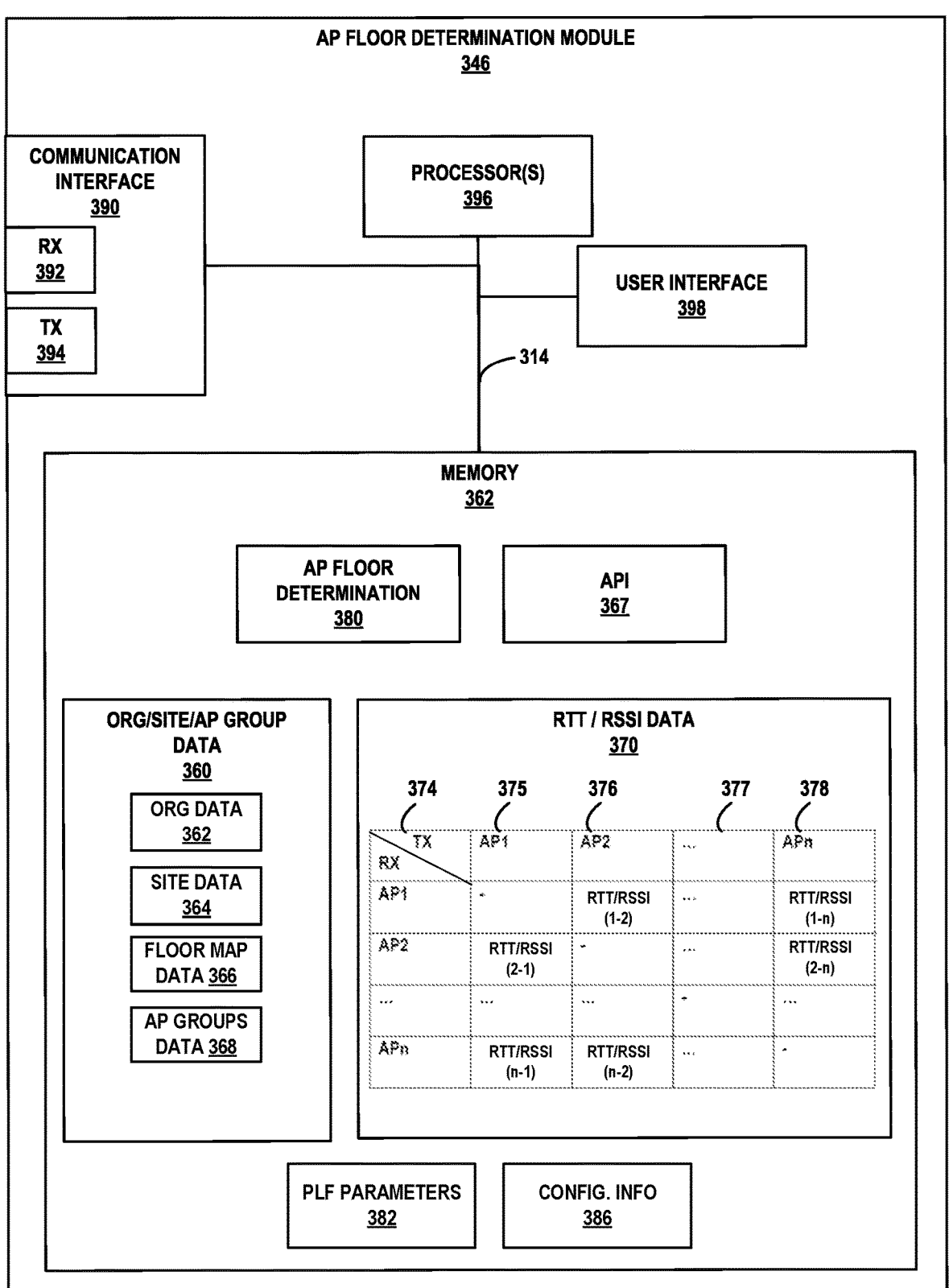
FIG. 3B is a block diagram of an example AP floor determination module configured to determine floor information for group(s) of one or more deployed access points (APs), in accordance with one or more techniques of the disclosure.

FIG. 3B is a block diagram of an example AP floor determination module 346 configured to determine floor information for group(s) of APs, in accordance with one or more techniques of the disclosure. AP floor determination module 346 determines floor information for group(s) of APs based at least in part on estimated distances between the groups of APs. For example, AP floor determination module 346 of NMS 300 estimates a distance between a first group of APs and a second group of APs based at least in part on an estimated distance between at least one AP in the first group of APs and at least one AP in the second group of APs.

In general, each AP 142 includes one or more wireless transmitter(s) by which the AP transmits wireless signals and one or more receiver(s) that receives wireless signals from one or more other APs 142 and/or wireless client devices associated with a wireless network. In some examples, the receiving AP uses the power of the received wireless signals to determine the received signal strength (RSSI) associated with the wireless signals received by the AP and originating from (e.g., transmitted by) one or more other APs in the wireless network. Each AP may also be configured to measure a time of flight (ToF)-based round trip time (RTT) between the AP and one or more other APs. The RTT and/or RSSI measurements may be stored in, for example RTT/RSSI log 252. The RTT and/or RSSI measurements may be used to estimate a distance between the two APs. The RSSI and/or RTT measurements and/or the corresponding estimated distances may also be transmitted from the APs to NMS 300 where it may be stored as RTT/RSSI data 370. When executed by one or more processors of NMS 300, AP floor determination module 346 automatically determines floor information (e.g., an identification of a specific floor number of a plurality of floor numbers of a multi-floor structure) for group(s) of APs.

In the example of FIG. 3B, AP floor determination module 346 of NMS 300 includes a communications interface 390, e.g., an Ethernet interface, a hardware processor(s) 396, a user interface 398 (e.g., display, printer, keyboard, keypad, touch screen, mouse, stylus, etc.), and a memory 362 coupled together via a bus 314 over which the various elements interchange data and information. Communications interface 390 couples the AP floor determination module 346 to a network and/or the Internet. Communications interface 390 includes a receiver 392 via which the AP floor determination module 346 receives data and information, e.g., including RTT and/or RSSI information from the various APs, and a transmitter 394, via which AP floor determination module 346 transmits data and information, e.g., including location information for one or more wireless devices, and confirm receipt of information from other devices of the network.

Memory 362 includes, for example, a data structure that stores RTT and/or RSSI data (e.g., RTT/RSSI data 370), a data structure 360 that stores organization data 362, site data 364, map data 366, and group data 368, an AP floor determination module 380, an API 367, configuration information 386, and path loss function (PLF) parameters 382. Module 380 includes one or more software modules that, when executed by the one or more processors(s) 396, cause processors 396 to determine floor information for one or more group(s) of APs deployed to provide a wireless network at a site. RTT/RSSI data 370 includes a list of a plurality of APs, AP1-APn, associated with a wireless network. Columns 375 through 378 provide an example data structure that stores the RTT and/or RSSI values measured by each AP with respect to one or more other APs. For example, table 370 indicates that AP1 measured an RTT value with respect to AP2 and/or measured an RSSI value with respect to a wireless signal transmitted from AP2 as indicated by RTT/RSSI (1-2). AP1 measured an RTT value with respect to APn and/or measured an RSSI value with respect a wireless signal transmitted from APn as indicated by RTT/RSSI (1-n), etc. If a RSSI value of a wireless signal is not above a certain threshold, the corresponding cell might be left blank or otherwise to indicate that the two APs are not "neighbors." The RTT/RSSI values may include a time stamp and/or may be updated periodically or on demand to reflect the current state of the wireless network and/or to store historical RTT/RSSI information concerning the state of the wireless network. Configuration information 386 stores configuration parameters entered by the system administrator or by the programmer. Path loss function (PLF) parameters 382 provide storage for static or dynamic path loss function parameters, such as path loss exponent (PLE) and/or intercept (Int) as needed (or derived) by NMS 300.

It should be noted that for sake of simplicity the table 370 illustrates a simplified example wherein each AP has only a single antenna and as such can transmit/receive only a single signal from another AP. In other example implementations, each of the one or more APs may include multiple (e.g., two or more or in one specific example) antennas and as such are capable of receiving/transmitting multiple signals from/to antennas of the other APs associated with the wireless network and determining associated RTT/RSSI information corresponding to each antenna (and the associated receivers/transmitters).

Figures 3C, 3D:
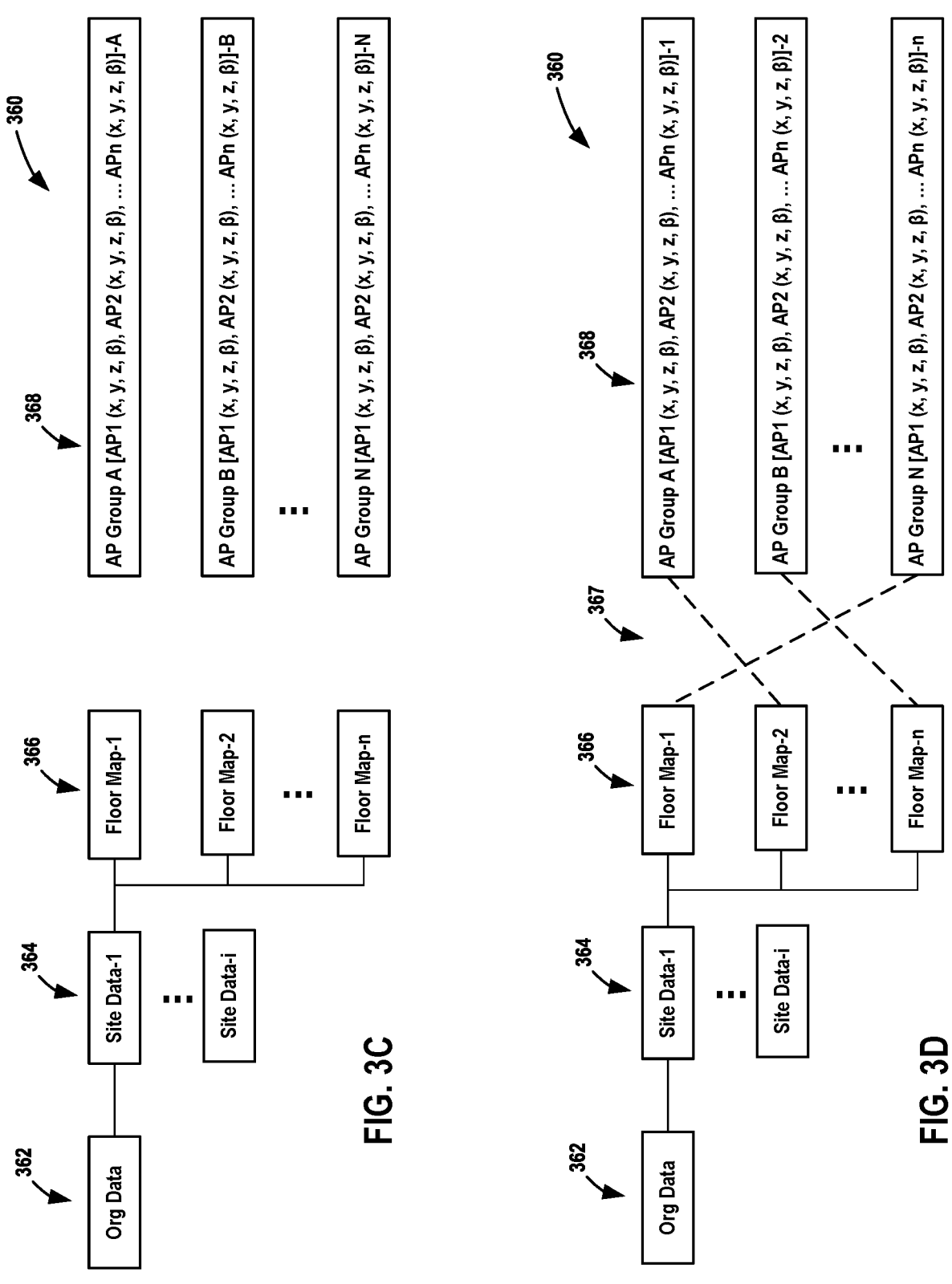
FIGS. 3C and 3D show more detailed diagrams of an example data structure for an organization, in accordance with one or more techniques of the disclosure.

In accordance with one or more techniques of the disclosure, memory 362 further includes a data structure 360 configured to store organization data 362, site data 364, floor map data 366, and AP groups data 368 corresponding to one or more organizations for which NMS 300 provides wireless network services. FIG. 3C shows a more detailed diagram of an example data structure 360 for one organization 362. Organization data 362 includes, for example, a name or other identifying information of an organization for which NMS 300 provides wireless network services. Organization data 362 may also include any other organization-specific information. Data structure 360 further stores data associated with each of a plurality of sites 364, labeled site data-1 through site data-i, each corresponding to a site at which a wireless network is deployed, where i includes any integer number of sites. The site data 364 associated with each site includes a name or other identifying information for each site, and may also include any other site-specific information.

The site data 364 for each of the sites is further associated with each of floor map-1 through floor map-n, where n is any integer number of floors of a multi-floor structure corresponding to the respective site.

Data structure 360 further stores data concerning each of a plurality of groups 368 of APs installed at the site 364. The groups of APs (also referred to herein as AP groups) are labeled AP Group A through AP Group N, where N is any integer number of AP groups. The labels for the AP groups 368 (e.g., AP Group A, AP Group B, AP Group N, etc.) are arbitrarily assigned and are not themselves indicative of which specific floor number (e.g., floor number 1 or first floor, floor number 2 or second floor, floor number 3 or third floor, etc.) of the multi-floor structure on which the group of APs 368 is installed. Thus although the AP groups 368 are stored as groups of associated APs, they are not associated with a specific floor map 366.

Each AP group 368 includes a list of one or more APs that are installed on the same floor number of a multi-floor structure. For example, each AP Group A through AP Group N includes a list of APs AP1-APn, where n is any integer number of APs, and can be a different number of APs in each group (in other words, in one example, AP Group A might include 5 APs, whereas AP Group B includes 12 APs, etc. The AP identifier (e.g., "AP1" in AP Group A) for each AP may include a unique ID such as the MAC address of the AP. However, any unique ID may be used, and the disclosure is not limited in this respect. For each AP, data structure 360/368 stores location information, such as an x, y coordinate location, a height (z coordinate), and an orientation angle ($\beta$). The x, y, z coordinate locations and orientation angle $\beta$ may be automatically or manually determined with respect to a global coordinate system associated with the multi-floor structure or site at which the plurality of APs are installed to provide one or more wireless networks.

Returning back to FIG. 3B, AP floor determination module 380 determines floor information for each group of APs (e.g., AP group A through AP group N in AP groups data 368) deployed at one or more sites (e.g., site data-1 in site data 364). For example, for each AP group in AP groups data 368, AP floor determination module 380 determines floor information indicative of a specific floor number (e.g., first floor, second floor, third floor, etc.) of a multi-floor structure associated with the site identified in site data 364 at which the AP group is installed. The floor information for each AP group in AP groups data 368 is determined based on estimated distances between the groups of APs and x, y coordinate locations of the APs.

By determining floor information for each group of APs in AP group data 368, AP floor determination module 346 associates each AP group in AP group 368 with a specific floor number of the multi-floor structure for the respective site. In the example of FIG. 3D, floor determination module 346 automatically determined that AP Group A is associated with floor number 2, AP Group B is associated with floor number n, and AP Group N is associated with floor number 1.

Each floor map in floor map data 366 may be associated with one or more groups of APs in AP group data 368. That is, some floors of the multi-floor structure may include two or more groups of APs, and thus the floor map corresponding to that floor number may be associated with two or more groups of APs. However, each group of APs may only be associated with one floor map. Furthermore, if floor determination module 380 determines that no APs are installed on a certain floor number of the multi-floor structure, floor determination module 380 will not associate the floor map corresponding to that floor number with any AP groups.

Figure 4:
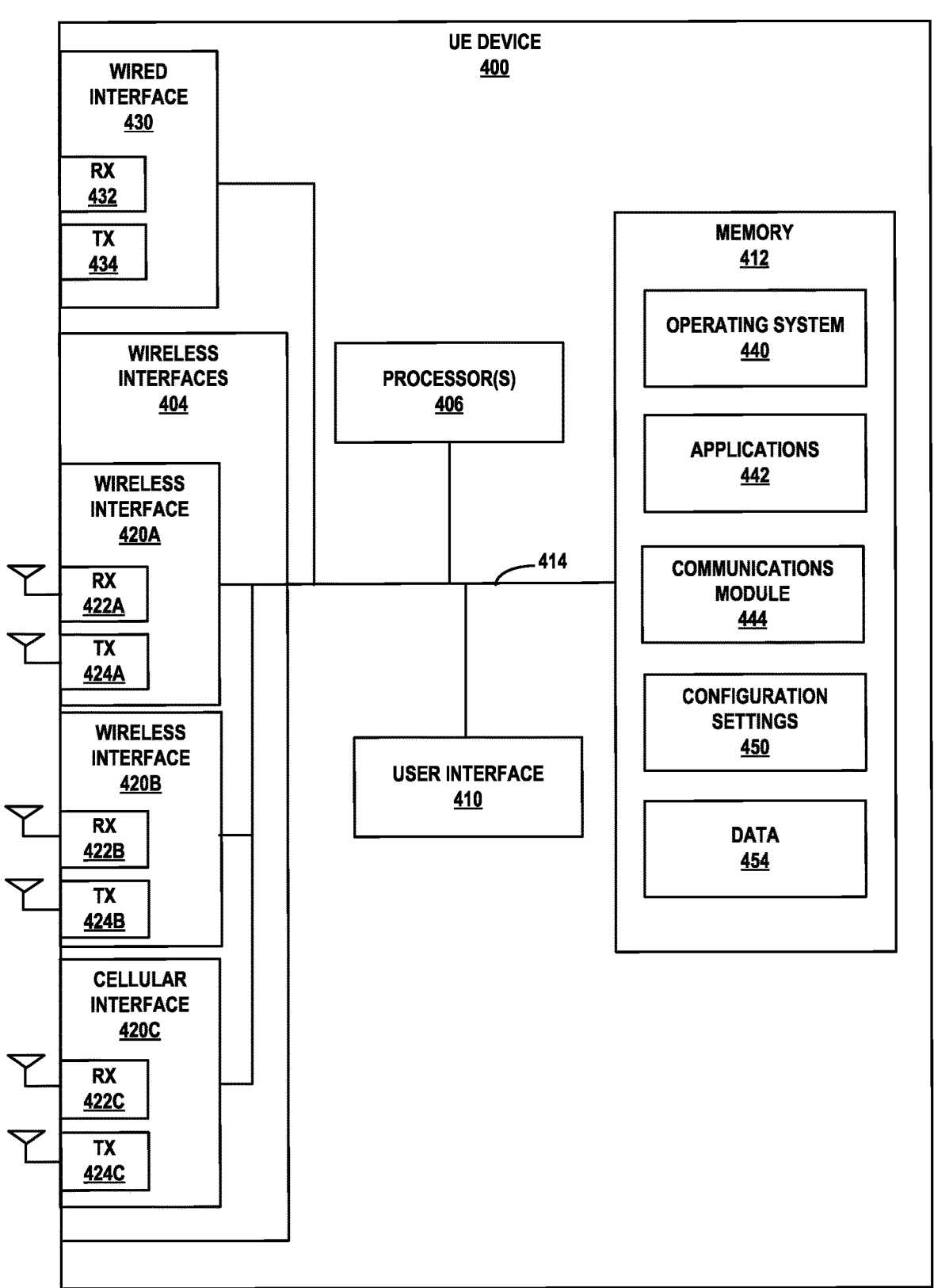
FIG. 4 is a block diagram of an example user equipment device in accordance with one or more techniques of the disclosure.

FIG. 4 shows an example user equipment (UE) device 400. Example UE device 400 shown in FIG. 4 may be used to implement any of UEs 148 as shown and described herein with respect to FIG. 1. UE device 400 may include any type of wireless client device, and the disclosure is not limited in this respect. For example, UE device 400 may include a mobile device such as a smart phone, tablet or laptop computer, a personal digital assistant (PDA), a wireless terminal, a smart watch, a smart ring or any other type of mobile or wearable device. UE 400 may also include any type of IoT client device such as a printer, a security sensor or device, an environmental sensor, or any other connected device configured to communicate over one or more wireless networks.

In accordance with one or more techniques of the disclosure, NMS 130/300 receives relevant network data from UEs 148 on a continuous basis (e.g., every 2 seconds or other appropriate time period). The network data 454 may include, for example, RSSI measurements of one or more wireless signals received from one or more AP devices by UE 400 as measured by the AP devices, as well as any other network information obtained or measured by the UEs.

UE device 400 includes a wired interface 430, wireless interfaces 420A-420C, one or more processor(s) 406, memory 412, and a user interface 410. The various elements are coupled together via a bus 414 over which the various elements may exchange data and information. Wired interface 430 includes a receiver 432 and a transmitter 434. Wired interface 430 may be used, if desired, to couple UE 400 to network(s) 134 of FIG. 1A. First, second and third wireless interfaces 420A, 420B, and 420C include receivers 422A, 422B, and 422C, respectively, each including a receive antenna via which UE 400 may receive wireless signals from wireless communications devices, such as AP devices 142 of FIG. 1A, AP device 200 of FIG. 2, other UEs 148, or other devices configured for wireless communication. First, second, and third wireless interfaces 420A, 420B, and 420C further include transmitters 424A, 424B, and 424C, respectively, each including a transmit antenna via which UE 400 may transmit wireless signals to wireless communications devices, such as AP devices 142 of FIG. 1A, AP device 200 of FIG. 2, other UEs 148 and/or other devices configured for wireless communication. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy interface. Third wireless interface 420C may include, for example, a cellular interface through which UE device 400 may connect to a cellular network.

Processor(s) 406 execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of UE 400. For example, memory 412 may include a computer-readable storage medium, such as non-transitory computer-readable mediums including a storage device (e.g., a disk drive, or an optical drive) or a memory (such as Flash memory or RAM) or any other type of volatile or non-volatile memory, that stores instructions to cause the one or more processor(s) 406 to perform one or more of the techniques described herein.

In this example, memory 412 includes an operating system 440, applications 442, a communications module 444, configuration settings 450, and data storage for network data 454. Data storage for network data 454 may include, for example, a status/error log including network data specific to UE 400. As described above, network data 454 may include any network data, events, and/or states that may be related to determination of one or more roaming quality assessments. The network data may include event data such as a log of normal events and error events according to a logging level based on instructions from the network management system (e.g., NMS 150/300). Data storage 454 may store any data used and/or generated by UE 400, such as network data used to determine proximity to a proximity zone, that is collected by UE 400 and transmitted to any of AP devices 142 in a wireless network 106 for further transmission to NMS 150. In one example implementation the data may include value of a measured RSSI of signals from various APs and/or measurements of RTT for signal traveled between the UE and one or more APs.

Communications module 444 includes program code that, when executed by processor(s) 406, enables UE 400 to communicate using any of wired interface(s) 430, wireless interfaces 420A-420B and/or cellular interface 420C. Configuration settings 450 include any device settings for UE 400 settings for each of wireless interface(s) 420A-420B and/or cellular interface 420C.

Figure 5:
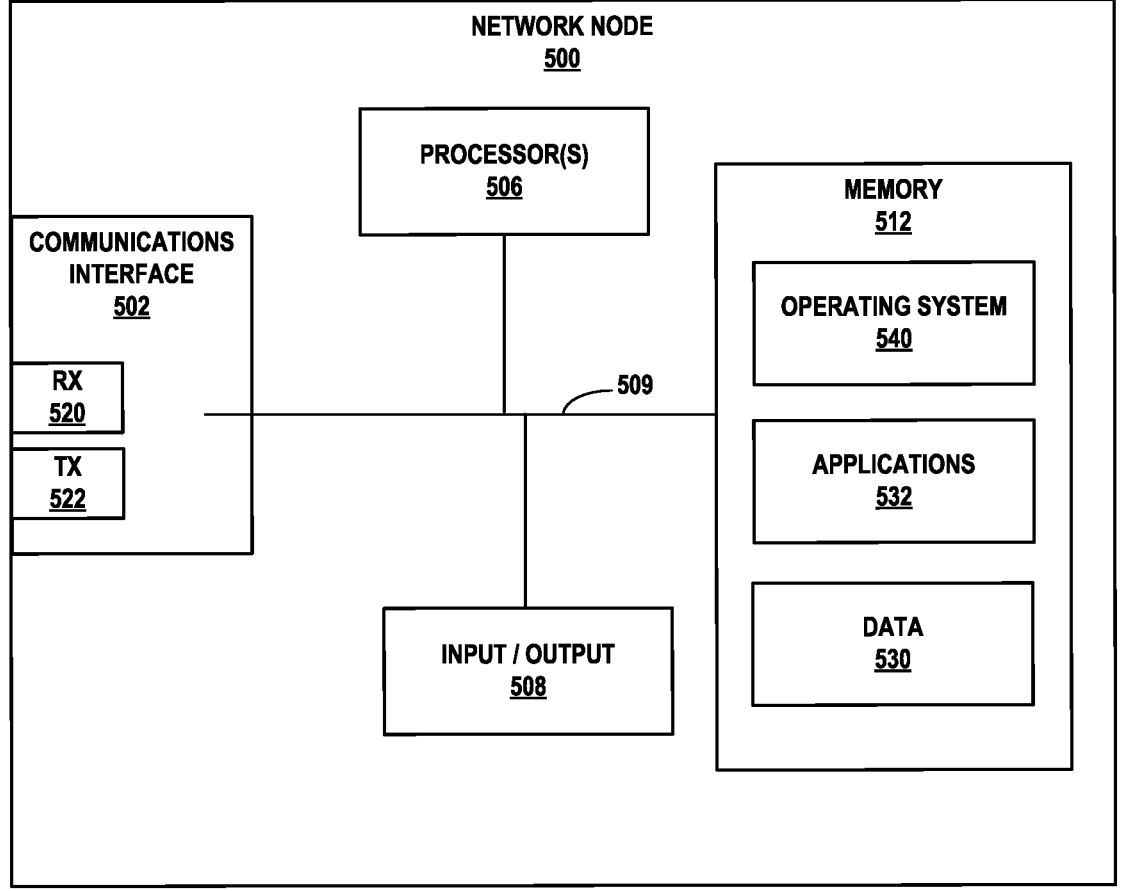
FIG. 5 is a block diagram of an example network node, such as a router or switch, in accordance with one or more techniques of the disclosure.

FIG. 5 is a block diagram illustrating an example network node 500 configured according to the techniques described herein. In one or more examples, the network node 500 implements a device or a server attached to the network 134 of FIG. 1A, e.g., router, switch, AAA server 110, DHCP server 116, DNS server 122, VNA 133, AP location module 135, Web server 128A-128X, etc., or a network device such as, e.g., routers, switches, or the like.

In this example, network node 500 includes a communications interface 502, e.g., an Ethernet interface, a processor 506, input/output 508 (e.g., display, buttons, keyboard, keypad, touch screen, mouse, etc.), and a memory 512 coupled together via a bus 509 over which the various elements may interchange data and information. Communications interface 502 couples the network node 500 to a network, such as an enterprise network.

Though only one interface is shown by way of example, those skilled in the art should recognize that network nodes may have multiple communication interfaces. Communications interface 502 includes a receiver 520 via which the network node 500 can receive data and information (e.g., including data indicative of distances between APs, and/or operation related information such as registration request, AAA services, DHCP requests, Simple Notification Service (SNS) look-ups, and Web page requests). Communications interface 502 includes a transmitter 522, via which the network node 500 can send data and information (e.g., including location information, configuration information, authentication information, web page data, etc.).

Memory 512 stores executable software applications 532, operating system 540 and data/information 530. Data 530 includes system log and/or error log that stores network data and/or proximity information for node 500 and/or other devices, such as wireless access points, based on a logging level according to instructions from the network management system. Network node 500 may, in some examples, forward the network data to a network management system (e.g., NMS 130/300 of FIG. 1A, 1B or 3A) for analysis as described herein. Network node 500 may in some examples perform one or more of the techniques for automatically determining floor information for group(s) of APs as described herein.

Figure 6:
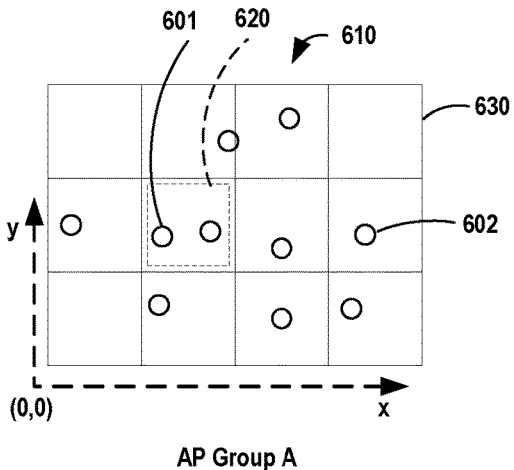
FIG. 6 shows conceptual diagrams of four groups of APs shown in their respective x, y coordinate locations within each group, in accordance with one or more techniques of the disclosure.
Figure 6:
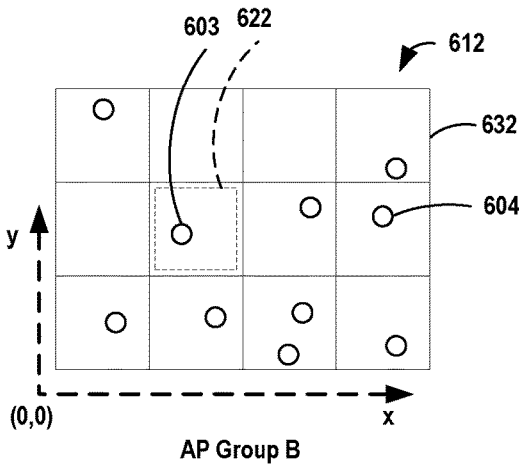
Figure 6:
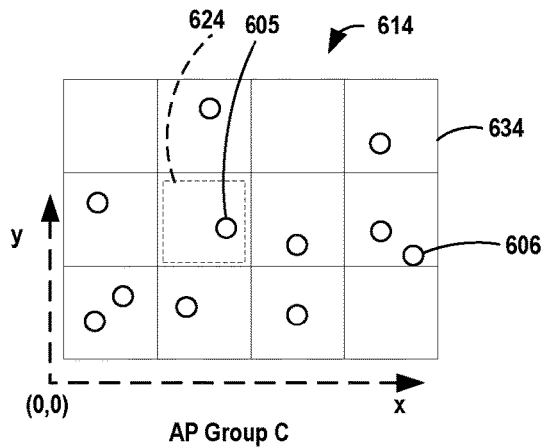
Figure 6:
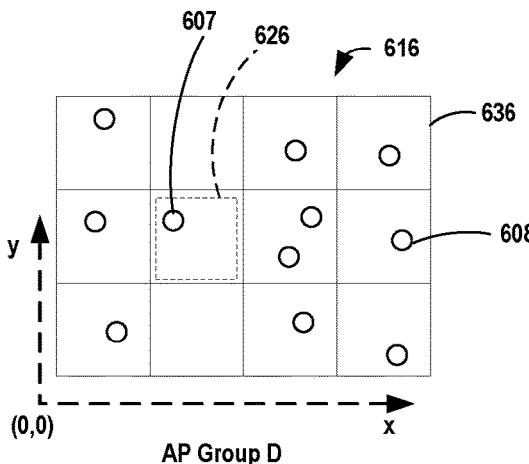

FIG. 6 shows conceptual diagrams of four groups of APs, AP group 610, AP group 612, AP group 614 and AP group 616. A region generally defining an x-y plane for the site (e.g., the floor of the multi-floor structure) is indicated for each AP group 610, 612, 614 and 616 by reference numerals 630, 632, 634, and 636, respectively. In the example of FIG. 6, the reference numerals of the AP groups and the regions are not indicative of any particular order or sequence of the AP groups within the multi-floor structure associated with any of the AP groups. Rather, each AP group is indicative of one or more APs that are deployed on the same floor of a multi-floor structure; however, the AP groups 610, 612, 614 and 616 and/or the name or label assigned to the APs group(s), in and of themselves are not indicative of a specific floor number of the multi-floor structure at which any of the AP groups are deployed.

The x, y coordinate locations of each AP with respect to the global coordinate system are stored in a data structure or other storage device, such as AP group data 368 shown in FIG. 3B-3D. In some examples, the x, y coordinate locations of the APs in a global coordinate system are automatically determined, such as described herein with respect to AP location module 344 as shown in FIG. 3A. In other examples, the x, y coordinate locations of the APs are determined manually at the time of installation or at some other time. In other examples, the x, y coordinate locations may be determined using some other method or combination of any of these methods, and the disclosure is not limited in this respect. The orientation angle, B, for each AP may also be either automatically or manually determined and stored in AP group data 368.

The z coordinate for each AP is also stored in AP group data 368 along with the x, y coordinate locations and/or the orientation angle, B. In some examples, the z coordinate for each AP is manually measured and entered into the system at the time of installation (or at a later time), and is generally indicative of whether the AP is installed on a ceiling, on a wall, or on the floor. In some examples, the x, y coordinate locations of each AP are automatically determined and the z coordinate is manually measured. In other examples, the x, y and z coordinate locations for each AP are automatically determined by AP location module 344 as described herein.

For example, in general, for APs installed on a ceiling, the z coordinate measurement would typically be the vertically measured distance (height) from the floor to the ceiling (e.g., 2.7 meters for a 9 foot ceiling height). For APs installed on a wall, the z coordinate measurement (vertically measured distance from the floor or height at which the AP is mounted) could be any distance from the floor depending upon how high from the floor the AP is installed. For APs installed on or near the floor (e.g., on the floor itself, very low on a wall or on a low table), the z coordinate measurement would be relatively nearer to zero than APs mounted on the ceiling or the wall. Other installation options may also exist, and the disclosure is not limited in this respect.

In these examples, the value of the z-coordinate for each AP is indicative of the height or vertical distance of the AP from the floor of the particular floor of the multi-floor structure where the AP is deployed but is not indicative of the overall height of the AP from the ground or other reference point for the multi-floor structure. Thus, the x, y, z coordinate locations for each AP are generally not, in an of themselves, indicative of the specific floor number (e.g., first floor, second floor, third floor, etc.) of the multi-floor structure on which the APs are deployed.

In the examples of FIG. 6, the APs in each group are shown in their respective x, y coordinate locations within each group in a global coordinate system. The x- and y-axes of the global coordinate system are shown. AP group 610 includes, for example, APs 601 and 602; AP group 612 includes, for example, APs 603 and 604; AP group 614 includes, for example, APs 605 and 606, and AP group 616 includes, for example, APs 607 and 608. In this example, assume that the one or more APs in each group are deployed in a typical installation on the ceiling of the same floor of a multi-floor structure, and thus the one or more APs of each group are shown at their respective x, y coordinate locations in the x-y plane of the global coordinate system indicated by regions 630, 632, 634, and 636, respectively.

In accordance with one or more techniques of the disclosure, a computing device, such as NMS 130/300 executing AP floor determination module 346, automatically determines floor information for group(s) of one or more deployed APs, such as AP groups 610, 612, 614 and 616. The floor information for each group of APs may include, for example, a specific floor number of a multi-floor structure on which the group of APs is installed. The NMS determines the floor information for each group of APs based on estimated distances between the groups of APs. In some examples, the NMS estimates a distance between a first group of APs and a second group of APs based on distance measurements between at least one AP in the first group of APs and at least one AP in the second group of APs and x, y coordinate locations of the at least one AP in the first group of APs and the at least one AP in the second group of APs. The distance measurements may include, for example, round-trip-time (RTT) and/or received signal strength indicator (RSSI) based distance measurements between the at least one AP in the first group of APs and the at least one AP in the second group of APs.

In some examples, in order to reduce complexity of computation, each region (e.g., floor of a multi-floor structure) is divided into one or more sub-regions. In the examples shown in FIG. 6, each region is divided into twelve sub-regions, including sub-regions 620, 622, 624, and 626. However, any number of sub-regions may be used, and the disclosure is not limited in this respect. In this example, the boundaries of the sub-regions for each group are defined by the same x, y coordinates as the corresponding sub-regions in the other groups. Thus, sub-region 620 of group 610 corresponds to (e.g., the boundary of the sub-region is defined by the same x, y coordinates as) sub-region 622 of group 612, sub-region 624 of group 614 and sub-region 626 of group 616. When determining distances between group(s) of one or more APs, NMS 130/300 may confine calculations to APs within respective sub-regions so as to reduce computational complexity. However, the groups need not be divided into sub-regions, and the disclosure is not limited in this respect.

In accordance with one or more techniques of the disclosure, the NMS determines the floor information for each group of APs based on estimated distances between the groups of APs. For example, to estimate a distance between AP group 610 and AP group 612, NMS may measure a distance between AP 601 in AP group 610 and AP 603 in AP group 612. The distance measurements may include, for example, round-trip-time (RTT) and/or received signal strength indicator (RSSI) based distance measurements between AP 601 and AP 603. The NMS may then estimate the distance between AP group 610 and AP group 612 based on the measured distances between AP 601 and AP 603 and the x, y coordinate locations of AP 601 and AP 603. This process may be repeated for one or more of the APs in each AP group 610 and 612 and for one or more combinations of APs from each group to arrive at one or more estimated distances between AP groups 610 and 612. The one or more estimated distances between AP groups 610 and 612 may be averaged or otherwise aggregated to determine an aggregated estimated distance between AP groups 610 and 612.

Distances between one or more combinations of AP groups 610, 612, 614 and 616 may be similarly determined. In some examples, NMS 300 estimates at least one distance between each possible pair of AP groups. In other examples, NMS 300 need not estimate distances between each possible pair of AP groups. For example, depending upon the characteristics of the multi-floor structure, such as the height of the structure, the building materials, multi-path and/or path loss characteristics of the structure, etc., RTT and/or RSSI distance measurements between APs of different groups may not be sufficiently accurate (or obtainable) to reliably estimate the distance between those groups of APs. In general, for each group of APs, NMS 300 estimates a distance between the group of APs and at least two other groups of APs to determine a relative order or sequence of all of the groups of APs. In some examples, NMS 300 further estimates a distance between the other two groups of APs, or distances between other groups of APs to determine a relative order or sequence of all the groups of APs.

Figure 7A:
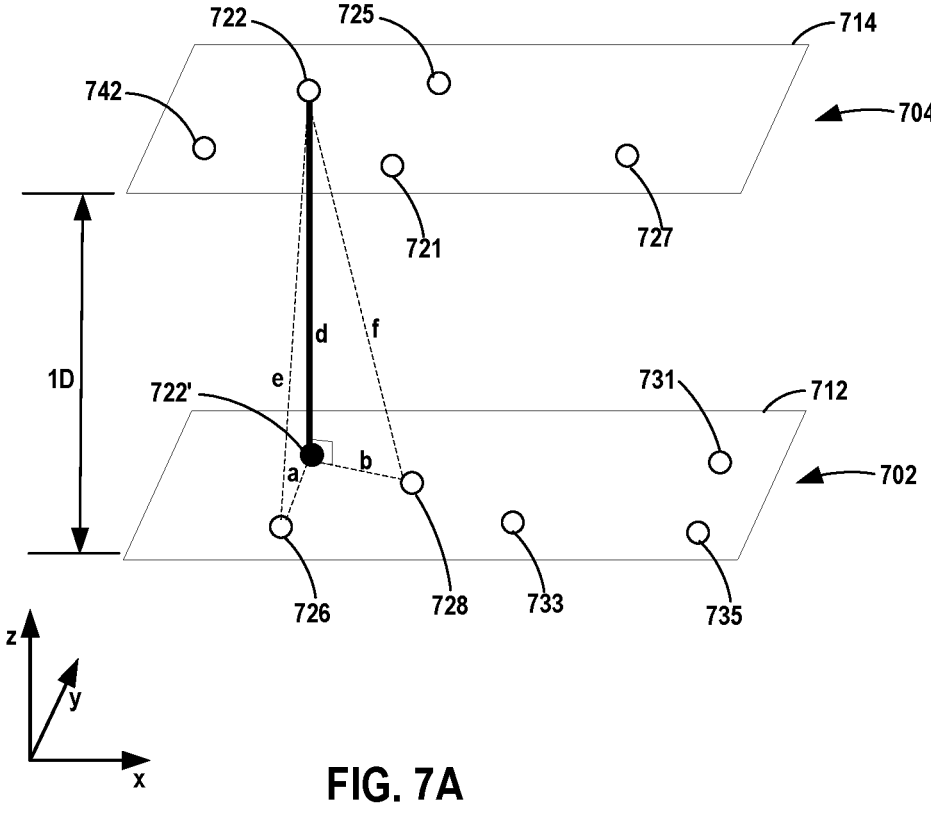
Figure 7B:
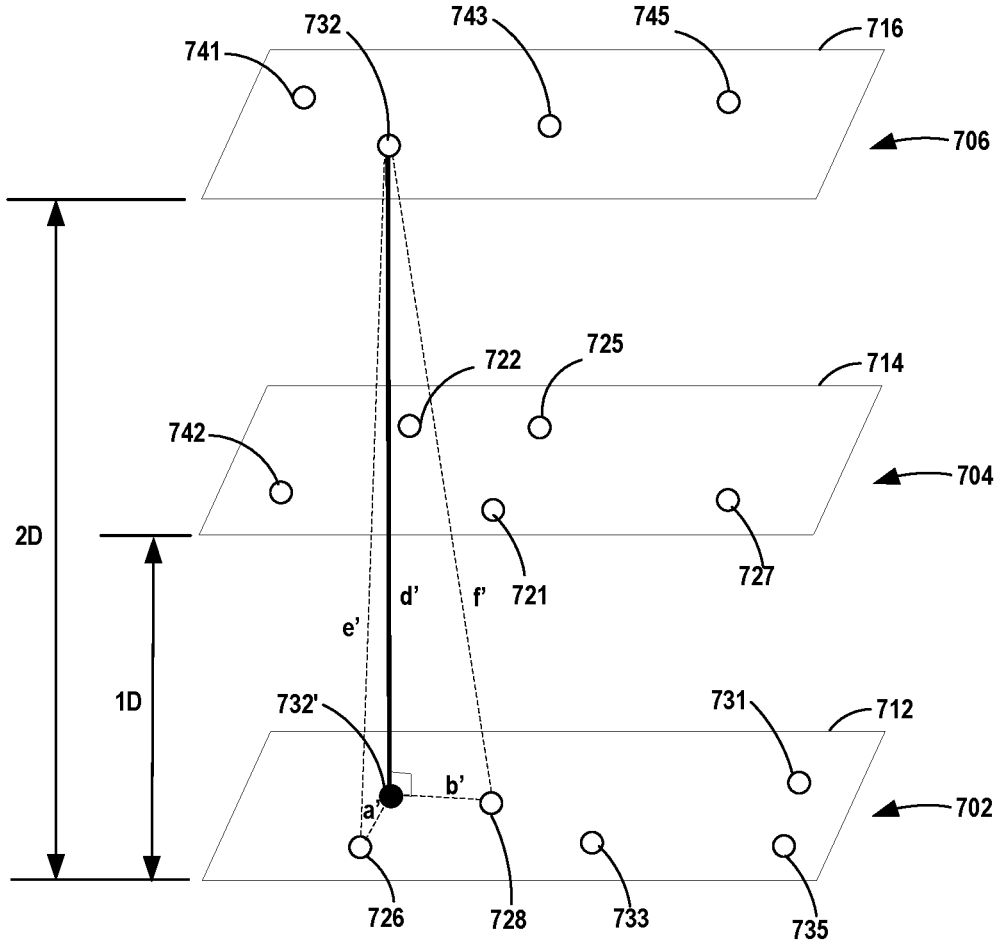
Figure 7B:
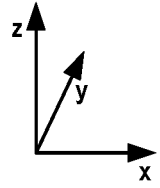
Figure 7C:
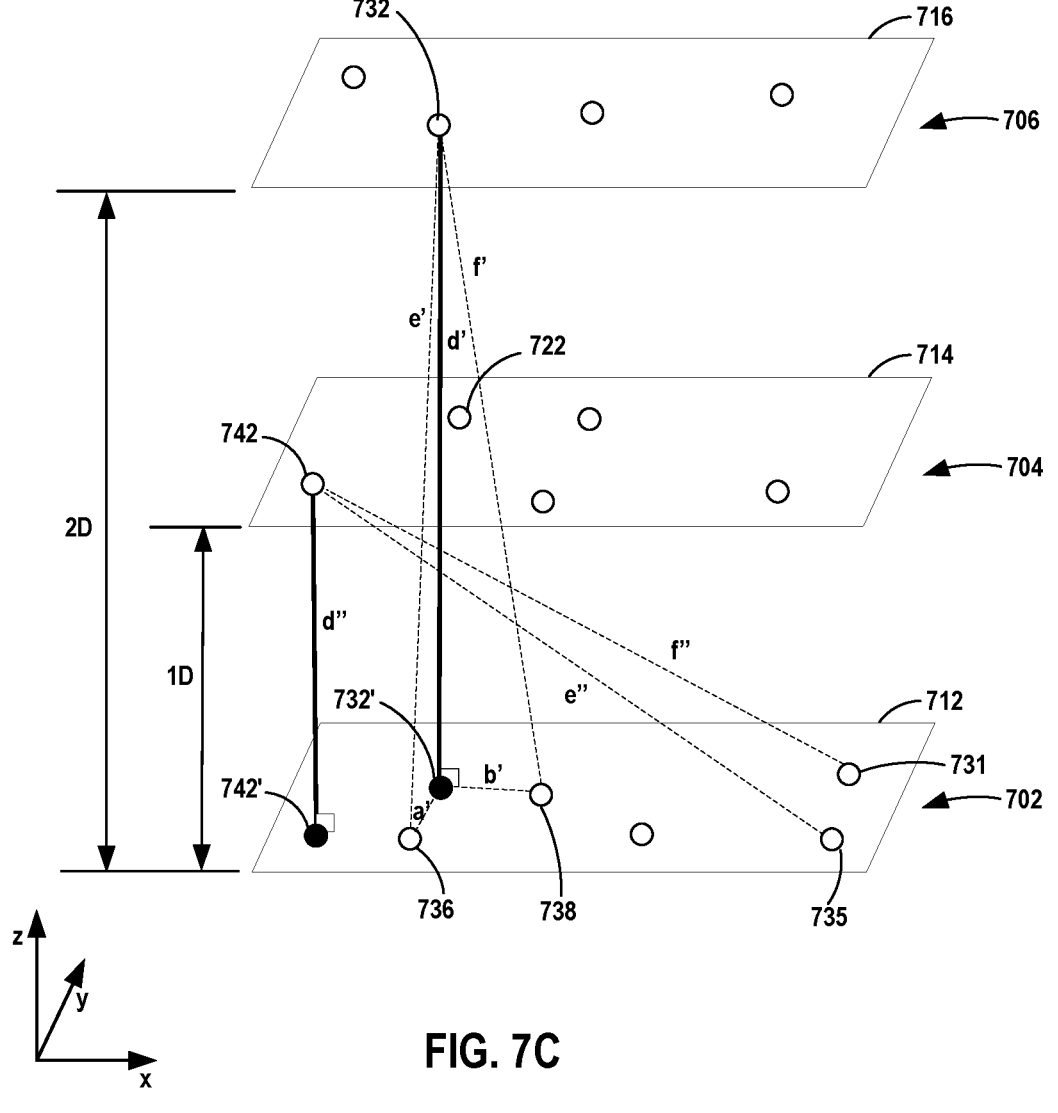

FIGS. 7A-7C are conceptual diagrams illustrating examples of estimating a distance between groups of APs, in accordance with one or more techniques of the disclosure. FIG. 7A shows two groups 702, 704 of APs. In this example, group 704 includes APs 722, 742, 721, 725 and 727, and group 702 includes APs 726, 728, 731, 733 and 735. A global coordinate system indicated by x-, y-, and z-axes is defined for a site including a multi-floor building or other structure at which the two groups 702, 704 of APs are deployed. In this example, assume for purposes of discussion that the one or more APs in each group are deployed in a typical installation on the ceiling of the same floor of a multi-floor structure, and thus the one or more APs of each group 702, 704 are shown at their respective x, y coordinate locations in the x-y planes 712, 714, respectively, parallel to the ceilings where they are deployed. However, this assumption is for purposes of discussion only and not by way of limitation, and it shall be understood that the techniques of the disclosure also apply to cases where the APs are deployed on both the ceiling and the floor, or any combination of APs deployed on the ceiling, wall and/or floor.

The x, y coordinate locations of the one or more APs in each group 702, 704 are known (e.g., as described herein with respect to FIGS. 3C and 3D). For purposes of illustration, the x, y coordinate location of AP 722 is reproduced in plane 712 as indicated by ref. num. 722'. Because the x, y coordinate locations of each AP 726, 728 and 722 (also indicated by 722') are known, the distances, a and b as shown in FIG. 7A can be determined based on the x, y coordinate locations of APs 726, 728 and 722 using the distance formula:

$$\text{distance } (a \text{ and/or } b) = \sqrt{((x2 - x1)^2 + (y2 - y1)^2)}$$

where (x1, y1) and (x2, y2) are the coordinates of the respective APs in the global coordinate system.

In addition, a distance between two APs that are members of different groups may be measured using, for example, RTT and/or RSSI-based ranging techniques. For example, to measure the distance, e, between AP 722 of group 704 and AP 726 of group 702, AP 722 may measure RSSI value(s) of a wireless signal received from AP 726 and determine a corresponding distance based on the measured RSSI value(s). In addition or alternatively, AP 726 may measure RSSI value(s) of a wireless signal received from AP 722 and determine a corresponding distance based on the measured RSSI value(s). The two measurements for the distance, e, may be averaged or combined in some other way to determine a final value for the distance, e. As another example, APs 722 and 726 may use RTT techniques to measure the distance, e, between the two APs based on measured RTT value(s). The distance, f, between AP 722 of group 704 and AP 728 of group 702 may be similarly determined using RTT and/or RSSI-based techniques. Once the distances e and/or f are determined, the distance d, defined as the distance between group 704 and group 702, may be also determined using, for example, the Pythagorean theorem (the distance d measurement making a right angle to the x-y plane). For example, the distances a and e enable calculation of a distance d1; the distances b and f facilitate calculation of a distance d2. The distances d1 and d2 may then be averaged to determine an estimated distance d between AP group 702 and AP group 704.

In some examples, NMS estimates multiple distances between two AP groups based on different pairs of APs in groups 702 and 704, and averages the multiple estimates of distances between the two groups to arrive at an aggregated estimate of the distance between AP groups 702 and 704.

The aggregated distance, d, between the two groups 702 and 704 may then be rounded to the closest integer multiple of a known distance, D, between consecutive floors of the multi-floor structure. In FIG. 7A, for example, the distance d is substantially equal to the distance 1×D, and thus the final distance between groups 702 and group 704 is determined to be 1D. In other words, the relative distance between groups 702 and 704 is one floor of the multi-floor structure.

At this point, due to flip ambiguity, it is unknown whether AP group 704 is deployed on the floor above AP group 702 or deployed on the floor below AP group 702. Rather, only the relative distance between the two AP groups 702 and 704 is known.

FIG. 7B shows three groups of APs 702, 704, and 706. FIG. 7B illustrates an example technique to determine a distance between AP group 702 and AP group 706. This distance between AP groups is indicative of the relative number of floors between the groups; or stated another way, how many floors apart the groups of one or more APs are deployed.

In the example of FIG. 7B, AP groups 702 and 704 are the same as those shown in FIG. 7A. AP group 704 includes APs 722, 742, 721, 725 and 727 and AP group 702 includes APs 726, 728, 731, 733 and 735. Group 706 includes APs 732, 741, 743 and 745. A global coordinate system indicated by x-, y-, and z-axes is defined for a site including a multi-floor building or other structure at which the three AP groups 702, 704, 706 are deployed.

Similarly to the example of FIG. 7A, in this example, it is assumed that the one or more APs in each AP group are deployed in a typical installation on the ceiling of the same floor of a multi-floor structure, and thus the one or more APs of each AP group 702, 704, 706 are shown at their respective x, y coordinate locations in the x-y plane indicated by reference numerals 712, 714, 716, respectively.

The x, y coordinate locations of the one or more APs in each AP group 702, 704, 706 are known (e.g., as described herein with respect to FIG. 3C). For purposes of illustration, the x, y coordinate location of AP 732 is reproduced in plane 712 as indicated by ref. num. 732'. Because the x, y coordinate locations of each AP 726, 728, and 732 in the global coordinate system (also indicated by 732') are known, the distances, a' and b' as shown in FIG. 7B can be determined based on the x, y coordinate locations of APs 726, 728 and 732' using the distance formula:

$$ \text{distance } (a' \text{ and/or } b') = \sqrt{((x2 - x1)^2 + (y2 - y1)^2)} $$

where (x1, y1) and (x2, y2) are the coordinates of the respective APs in the global coordinate system.

In addition, the distance between two APs that are members of different AP groups may be determined using, for example, RTT and/or RSSI-based ranging techniques. For example, to determine the distance, e', between AP 732 of AP group 706 and AP 726 of AP group 702, AP 732 may measure an RSSI value of a wireless signal received from AP 726 and determine a corresponding distance based on the measured RSSI value. In addition or alternatively, AP 726 may measure an RSSI value of a wireless signal received from AP 732 and determine a corresponding distance based on the measured RSSI value. The two measurements for the distance, e', may be averaged or combined in some other way to determine a final value for the distance, e'. As another example, AP 732 may transmit a wireless message to AP 726 (and/or vice versa) and measure the round trip time (RTT) required for the wireless signal to be sent and for acknowledgement of the wireless signal to be received, and determine a distance based on the measured RTT value. The distance, f', between AP 732 of group 706 and AP 728 of group 702 may be similarly determined using RTT and/or RSSI-based techniques. Once the distances e' and/or f' are determined, the distance d', defined as the distance between group 706 and group 702, may be also determined using, for example, the Pythagorean theorem (the distance d' measurement making a right angle to the x-y plane). Multiple distances between multiple pairs of APs from each of the two AP groups may be measured and combined as described above with respect to FIG. 7A.

The distance, d', between the two AP groups 702 and 706 may then be rounded to the closest integer multiple of a known distance, D, between consecutive floors of the multi-floor structure. In FIG. 7B, for example, the distance d' is substantially equal to the distance 2×D, and thus the distance between groups 702 and group 706 is determined to be 2D. In other words, group 702 and 706 are two floors apart in the multi-floor structure.

At this point, due to flip ambiguity, the relative order of groups 702, 704 and 706 is still unknown. In order to unambiguously determine the relative order of groups 702, 704 and 706, a distance between AP groups 704 and 706 should be determined. For example, if the distance between AP groups 704 and 706 is estimated to be 1D, the relative order or sequence of the AP groups is 702, 704, 706 (or vice versa) as shown in FIG. 7B. However, in another example, if the distance between AP groups 704 and 706 is estimated to be 3D, the relative order or sequence of the AP groups would be 706, 702, 704 (or vice versa). Thus, in some examples, for each of a plurality of groups of APs, a computing device estimates a distance between the group of APs and at least two other groups of APs (e.g., for AP group 702, estimate a distance between groups 702 and 704 and estimate a distance between groups 702 and 706). In some examples, the computing device further estimates a distance between these other two AP groups (e.g., for AP group 702, further estimate a distance between groups 704 and 706). In some examples, rather than estimating a distance between these other two AP groups, distances between other groups of APs are estimated such that the relative order or sequence of all of the groups can be unambiguously determined.

FIG. 7C shows the three groups 702, 704, 706 of APs as shown in FIG. 7B. The distances a', b', e', and f' are determined as described above with respect to FIG. 7B. Similarly, distances a" and b" between APs 742 and 735, APs 742 and 731, and APs 731 and 735, respectively, are determined based on the x, y coordinate locations of APs 731, 735 and 742 using, for example, the distance formula described above (a" and b" are not shown in FIG. 7C for purposes of clarity). The distances e" and f" between APs 742 and 735 and APs 742 and 731, respectively, are determined using, for example, RTT and/or RSSI techniques (because these are measurements between two APs that are members of different groups).

In FIG. 7C, assume that the distances e'=e" and f'=f" (FIG. 7C is not necessarily to scale). Using RTT/RSSI measurements alone is thus insufficient to accurately estimate the distance between groups of APs, as the RTT/RSSI measurements alone in this example would make it appear that APs 742 and 732 should be grouped together on the same floor number. In accordance with one or more techniques of the disclosure, the NMS estimates a distance between a first group of APs and a second group of APs based on RTT/RSSI distance measurements between at least one AP in the first group of APs and at least one AP in the second group of APs and x, y coordinate locations of the at least one AP in the first group of APs and the at least one AP in the second group of APs. As a result, using the techniques of the present disclosure, the estimates of the distances between groups of APs, e.g., d' and d", can be accurate. The NMS thus accurately estimates that AP group 704 is separated by a distance of 1D from AP group 702, and that AP group 706 is separated by a distance 2D from AP group 702.

In FIG. 7C, the nearest integer multiple of the distance, d', between the groups 702 and 706 is 2D (as described above with respect to FIG. 7B), wherein the nearest integer multiple of the distance d" between groups 702 and 704 is 1D (the same result achieved with respect to FIG. 1A, which was obtained using a different set of APs for the measurements).

The process described above with respect to FIGS. 7A-7C may be repeated for one or more of the APs in each group of deployed APs. In addition, for each individual AP in a group, RSSI and/or RTT values corresponding to multiple pairs of APs in each of the other groups may be measured. For example in FIG. 7A, in addition to measuring RTT/RSSI values between AP 722 and APs 726 and 728, RTT/RSSI values may be measured between AP 722 and APs 728 and 733, between AP 722 and APs 733 and 735, between AP 722 and APs 726 and 733, etc. The resulting distance between groups determined for one or more of the APs may be averaged or combined in some other manner to arrive at a final distance between two groups. The final distance between two groups may then be rounded to the nearest integer multiple of the known distance, D, between consecutive floors of the multi-floor structure.

Figure 7D:
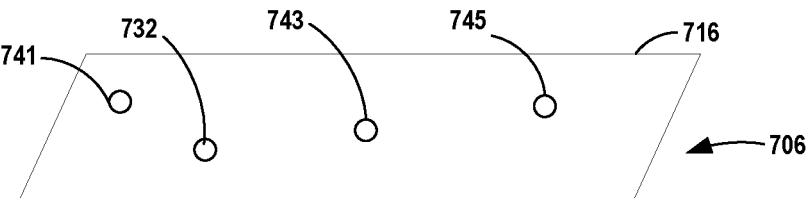
Figure 7D:
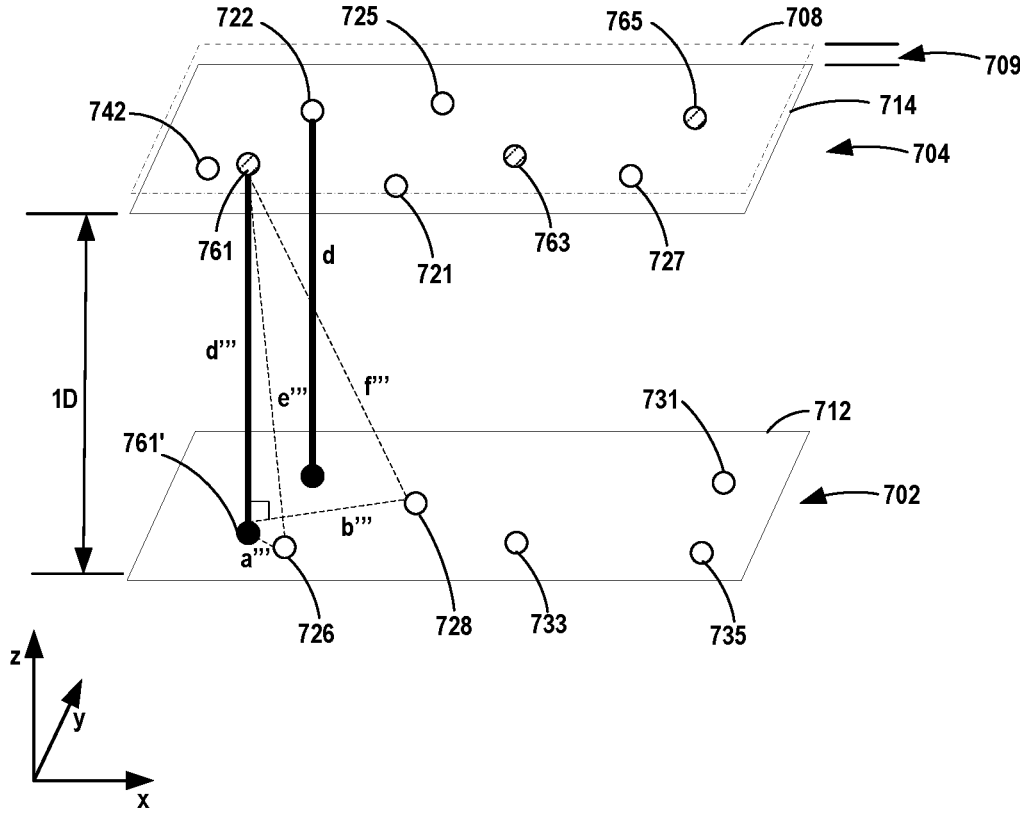

FIG. 7D shows AP groups 702, 704, and 706 as shown above with respect to FIGS. 7A-7C. The estimated distance d as determined between AP groups 702 and 704 as described above with respect to FIG. 7A is shown. FIG. 7D further shows three APs 761, 763, and 765 which are deployed in a floor mounted configuration on a floor represented by x-y plane 708. APs 761, 763, and 765 would be grouped with APs 741, 732, 743, and 745 which are mounted on the ceiling of the same floor number of the multi-floor structure. In this example, a distance 709 between the ceiling represented by x-y plane 714 and the floor represented by x-y plane 708 is small enough such that the nearest integer multiple of D to the estimated distance d'" between AP group 702 and AP group 704 based on AP 761 and APs 726 and 728 is 1D. This estimated distance, d'", considered alone, would tend to indicate that AP 761 should be grouped with AP group 704 instead of AP group 706; that is, it appears based on the RTT and x, y coordinate measurements yielding the estimated distance d" that AP 761 is mounted on the ceiling represented by x-y plane 714. In accordance with one or more techniques of the disclosure, in order to verify or confirm the proper AP groupings (and to thus help ensure each AP is associated with the correct floor number) the NMS may consider accelerometer data received from one or more APs identify and/or distinguish between APs mounted in a ceiling mount configuration and APs deployed in a floor mounted configuration. For example, accelerometer data associated with APs 761, 763 and 765 would indicate that those APs are deployed in a floor mount configuration (e.g., accelerometer data with an x-component close to 0, a y-component close to 0, and a z-component close to −1), whereas accelerometer data associated with APs 742, 722, 721, 725, and 727 (and also 741, 732, 743, and 745) for example, would indicate that those APs are deployed in a ceiling mount configuration (e.g., accelerometer data includes an x-component close to 0, a y-component close to 0, and a z-component close to 1). As a result, the NMS would confirm the assignment of AP 761 to AP group 706 based on the estimated distance measurement d'" (or reassign AP 761 to group 706 if it was improperly grouped).

Once the distances between all of the groups of one or more APs are determined (expressed as, for example, integer multiples of a known distance D, which is the distance between consecutive floors of a multi-floor structure at which the APs are deployed), a relative order of the groups may be determined. Referring again to FIG. 6, for example, assume the distances expressed as an integer multiple of D (the known distance between consecutive floors of a multi-floor structure) determined between groups AP Group A 610, AP Group B 612, AP Group C 614 and AP Group D 616 are as shown in Table 2:

TABLE 2

|  | AP Group A | AP Group B | AP Group C | AP Group D |
|---|---|---|---|---|
| AP Group A | — | 2D | 3D | 1D |
| AP Group B | 2D | — | 1D | 1D |
| AP Group C | 3D | 1D | — | 2D |
| AP Group D | 1D | 1D | 2D | |

Note that the distances between groups is indicative of the relative order or sequence of the groups, but is not indicative of whether the groups are in ascending order or descending order. In other words, the distances between groups is indicative of the relative order of the groups but is not indicative of which group of one or more APs should be assigned to the highest floor number of the multi-floor structure and which group of one or more APs should be assigned the lowest floor number of the multi-floor structure (e.g., the ascending order of the groups from the lowest floor number to the highest floor number), and also consequently to which specific floor number the remaining groups should be assigned.

In the example given in Table 2, there are two alternatives for assigning floor numbers to the groups based on the relative order of the groups (from lowest floor number to highest floor number, assuming floors are numbered from 1-4 in ascending order) are shown in Table 3:

TABLE 3

| Floor Number | AP Group-Alternative 1 | AP Group-Alternative-2 |
|---|---|---|
| 1 | AP Group A | AP Group C |
| 2 | AP Group D | AP Group B |
| 3 | AP Group B | AP Group D |
| 4 | AP Group C | AP Group A |

In accordance with one or more techniques of the disclosure, at least one group of APs is defined as an anchor group. The anchor group is associated with a defined floor number at the time of installation (or at some other appropriate time). For example, a service technician may assign a group of APs known to be deployed on a specific floor number of the multi-floor structure as an anchor group of APs and enter the floor information (e.g., the specific floor number) for the anchor group of APs in the database. In the example given above with respect to Table 1 and Table 2, for example, if the group specified by AP Group C is the anchor group and defined as being the fourth (top or highest) floor of the multi-floor structure, then the floor numbers assigned to each group of APs are as shown in the second column labeled AP Group-Alternative 1. If the group specified by AP Group A is the anchor group is defined as being the first (lowest) floor of the multi-floor structure, then the floor numbers assigned to each group of APs are also as shown in the second column labeled AP Group-Alternative 1. On the other hand, if the group specified by AP Group C is the anchor group is defined as being the first floor of the multi-floor structure, then the floor numbers assigned to each group are as shown in column 3 labeled AP Group-Alternative 2. Similarly, if the group specified by AP Group A is the anchor group and is defined as being the fourth floor of the multi-floor structure, then the floor numbers of each group are as shown in the third column labeled Group-Alternative 2.

In the example of Table 2, the distances between each group of APs and all of the other groups of APs have been determined as shown in the chart. That is, there is a distance estimate in each cell of the chart (except where the APs intersect with themselves). However, this is by way of example only, and the disclosure is not limited int the respect. In accordance with one or more techniques of the disclosure, it is not necessary to determine, for each group of APs, the distance between the group of APs and every other group of APs. For example, for each of a plurality of groups of APs, a computing device determines a distance between the group of APs and at least two other groups of APs. In some examples, the computing device further determines a distance between these other two AP groups. In some examples, other distances between groups of APs are determined such that the relative order or sequence of the groups can be determined without ambiguity.

FIGS. 7E and 7F are conceptual diagrams illustrating assignment of specific floor numbers to group(s) of APs, in accordance with one or more techniques of the disclosure. In FIG. 7E, a multi-floor structure includes an even number of floors (floor numbers 1-8 in this example). In accordance with one or more techniques of the disclosure, a computing device, e.g., NMS 130/300, has determined that the eight groups of one or more APs (labeled AP Groups A-H in this example) have a relative order of A-B-C-D-E-F-G-H (or vice versa).

As described above with respect to Tables 2 and 3, if AP Group A is defined as the anchor group and is defined as the first floor, then NMS 130/300 would assign AP Groups A-H as floor numbers from 1-8, respectively. Conversely, if AP Group H is defined as the anchor group and is defined as the first floor, NMS 130/300 would assign floor numbers 1-8 in reverse order such that AP Group G is the second floor, and AP Group A is the eighth floor, etc.

In some examples, almost any AP group can be defined as the anchor floor. In FIG. 7E, for example, where there are an even number of floors (and also for any multi-floor structure having an even number of floors), any AP group can be defined as the anchor AP group. For example, if AP Group E is defined as the anchor group and is assigned as floor number 5, the only correct assignment of floor numbers to the remaining groups is as shown under "Alternative 1, Floor Numbers correct." This is because there must be four floors below floor number 5 and three floors above floor number 5, so that only one of the two possible alternative floor assignments is the correct way to assign the floor numbers. Note that if the floor numbers were assigned as shown under "Alternative 2, Floor numbers incorrect," that there would not be enough floor numbers (i.e., the topmost floor, floor 8, has already been assigned to AP Group B) remaining to assign to AP Group A and there are not enough groups (i.e., the end-most group, AP Group H, has already been assigned as floor 2) remaining to assign to the first floor.

In FIG. 7F, for example, where there are an odd number of floors (and also for any multi-floor structure having an odd number of floors), any floor can be defined as the anchor floor except for the center-most floor. In FIG. 7F, there are 7 total floors in the multi-floor structure and 7 corresponding groups of one or more APs, labeled AP Groups A-G. The center-most floor corresponds to AP Group D in this example because there are an equal number of AP Groups on either side of AP Group D in the relative order defined by the sequence of groups A-G. If AP Group D is assigned as floor number 4 and is defined as the anchor group, there is ambiguity in the floor assignments because both Alternative 1 and Alternative 2 floor numbering schemas shown in FIG. 7F could be correct. Thus, in the example of a multi-floor structure having an odd number of floors, any floor can be defined as the anchor floor except for the center-most floor. In such examples, a different floor other than or in addition to the center floor may be assigned as an anchor floor to eliminate the possibility of any ambiguity in the floor number assignments.

Figure 8A:
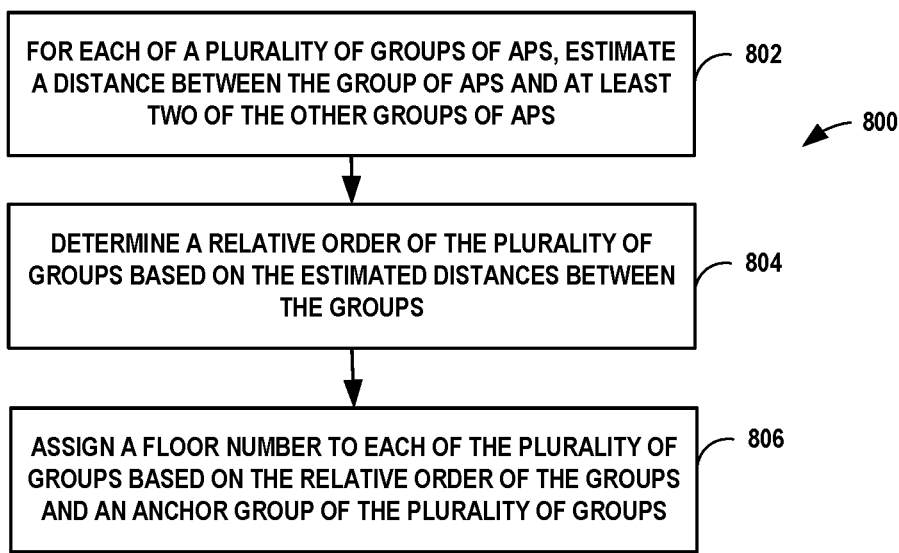
FIGS. 8A-8B are flowcharts of example processes by which a network management system determines floor information for group(s) of APs, in accordance with one or more techniques of the disclosure.
Figure 8B:
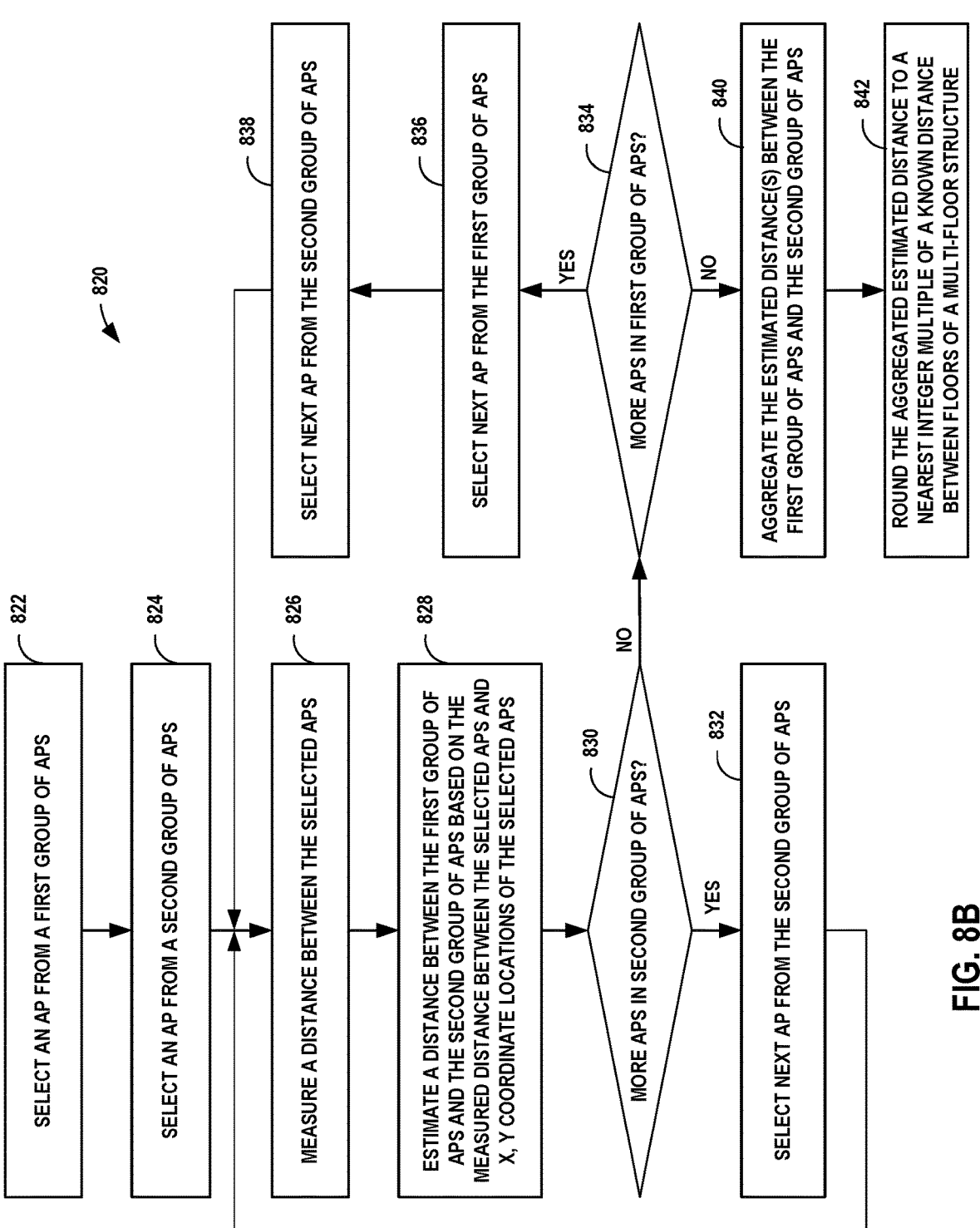

FIGS. 8A-8B are flowcharts of example processes (800, 820) by which a computing determines floor information for group(s) of APs, in accordance with one or more techniques of the disclosure. In some examples, the computing device includes one or more processor(s) of a network management system and/or an AP floor determination module 356, such as processor(s) 306 of NMS 130/300 as shown in FIGS. 1A-1B and/or FIGS. 3A-3C, and/or processors 396 of AP floor determination module 346 as shown in FIGS. 3A-3B. In such examples, the deployed APs may include APs 142/200 as shown in FIGS. 1A and/or FIG. 2, or any other devices in a wireless network, such as wireless networks 106 as shown in FIGS. 1A-1B. However, it shall be understood that the example of a wireless network is described herein for illustrative purposes only, and that the disclosure is not limited in this respect. In addition, although example processes of FIGS. 8A-8B are described as being executed by NMS 130/300, any computing device or group of computing devices, such as any one or more of APs 142/200, servers 128, network node 500 etc., may execute the functions described herein, and the disclosure is not limited in this respect. In some examples, one or more of the functions discussed below with respect to FIGS. 8A-8B may be performed by any of hardware processors 206, 306, 396, 406, or 506. In some examples, an AP floor determination module 346/380 stored in a memory (e.g., 212, 312, 362, 412, 512) configure the hardware processor to perform one or more of the functions discussed below.

FIG. 8A is a flowchart of an example process (800) by which a computing device automatically determines floor information for group(s) of one or more deployed access points (APs) in a wireless network, in accordance with one or more techniques of the disclosure. The floor information may include, for example, a specific floor number of a multi-floor structure on which the group of APs is installed.

For each of a plurality of groups of APs, the computing device determines a distance between the group and at least two other groups of APs (802). In some examples, the computing device further determines a distance between these other two AP groups. In some examples, the distance between a first group of APs and a second group of APs is based on estimated distance measurements between at least one AP in the first group of APs and at least one AP in the second group of APs and x, y coordinate locations of the at least one AP in the first group of APs and the at least one AP in the second group of APs. The estimated distance between group(s) may be expressed as an integer multiple of a known distance between consecutive floors of a multi-floor structure.

The computing device determines a relative order of the plurality of groups of APs based on the estimated distances between the groups (804). The relative order is indicative of a sequence (e.g., the order or sequence of the APs from the lowest floor to the highest floor or the highest floor to the lowest floor) of the plurality of groups of APs.

The computing device assigns a floor number to each of the plurality of groups of APs based on the relative order of the groups and an anchor group of APs selected from the plurality of groups of APs (806). The floor number of the anchor group APs is a defined floor number based on actual knowledge of the floor number on which the anchor group of APs is deployed. When the anchor group is defined as either the lowest (bottommost) or highest (topmost) floor of the multi-floor structure, the remaining groups of APs may be assigned in either ascending or descending order, respectively, based on the determined relative order or sequence of the groups. Alternatively, when the multi-floor structure includes an even number of floors, the anchor group of APs may be defined as any floor of the multi-floor structure. When the multi-floor structure includes an odd number of floors, the anchor group of APs may be defined as any floor of the multi-floor structure except for the center floor of the multi-floor structure.

In another example, rather than assigning a floor number to each of the plurality of groups of APs based on an anchor group of APs (806), the computing device may determine the order of floors based on measurements of barometric sensor readings from the various APs in the groups of APs.

Because barometric pressure is inversely proportional to altitude, barometric sensor data associated with the groups of APs will decrease as the height of the multi-floor structure increases. The computing device may obtain barometric sensor data sensed by the barometric sensors from the APs in each group of APs, aggregate them in some way, (e.g., average), and determine the specific floor number for each group of APs based on the aggregated barometric sensor data for each group of APs. Alternatively, the barometric sensor data from the various APs in each group of APs may be used to verify or confirm the determined floor information for each group of APs.

FIG. 8B is a flowchart of an example process (820) by which a computing device estimates a distance between a first group of APs and a second group of APs, in accordance with one or more techniques of the disclosure. The computing device selects an AP from a first group of APs (822). The computing device selects an AP from a second group of APs (824). The computing device measures a distance between the selected APs (826). The distance measurements may include, for example, round-trip-time (RTT) and/or received signal strength indicator (RSSI) based distance measurements between the selected APs. Although examples of measuring a distance between selected APs using RTT and/or RSSI techniques are described herein, it shall be understood that the computing device (and/or the APs) may use any automated method of measuring distances between two APs, and the disclosure is not limited in this respect.

The computing device estimates a distance between the first group of APs and the second group of APs based on the measured distance between the selected APs and x, y coordinate locations of the selected APs (828). Although x, y coordinate locations of the selected APs are described herein for an example implementation, coordinates in any type of coordinate system for the site may be used, and the disclosure is not limited in this respect.

The computing device determines whether there are more APs in the second group of APs for which a distance between the AP from the first AP group can be measured (830). If so (YES branch of 830), the computing device selects a next AP from the second group of APs (832), and repeats steps (826, 828) for the selected next AP from the second group of APs.

When there are no further APs in the second group of APs for which to measure a distance between the AP from the first AP group (NO branch of 830), the computing device determines whether there are more APs in the first group of APs for which distance(s) between one or more APs in the second group of APs can be measured (834). If so (YES branch of 834), the computing device selects a next AP from the first group of APs (836), selects a next AP from the second group of APs (838), and repeats steps (826, 828, 830) for the selected next AP from the first group of APs.

When there are no further APs in the first group of APs between which to measure a distance between one or more APs in the second group of APs (NO branch of 834), the computing device aggregates (e.g., averages or combines in some other manner) the estimated distance(s) between the first group of APs and the second group of APs (840). In some example, the computing device further rounds (or other approximates) the aggregated estimated distance to a nearest integer multiple of a known distance between consecutive floors of a multi-floor structure (842). In this way, the estimated distance between the first group of APs and the second group of APs is expressed as an integer multiple of the known distance between consecutive floors of the multi-floor structure, and thus the estimated distance between the first group of APs and the second group of APs can be expressed in terms of the relative number of floors between the first and second groups of APs. In accordance with one or more techniques of the disclosure, the estimated distance(s) between group(s) of APs can thus be used to determine a relative order or sequence of the groups of APs (e.g., step 806 of FIG. 8A).

In some examples, the computing device estimates a distance between the first group of APs and the second group of APs (i.e., executes process 820) based on distance measurements between at least one AP in the first group of APs and at least one AP in the second group of APs. In some examples, a decision as to whether a next AP in the first or second group is selected (e.g., 834/836 and/or 830/832) depends upon the quality of wireless signal(s) transmitted and/or received between two candidate APs. The quality of the wireless signal(s) may depend on the signal strength or power of the transmitted and/or received wireless signals, the signal-to-noise ratio of the transmitted and/or received wireless signals, etc. In general, a greater number of distance measurements between selected APs in the first and second groups of APs will result in a more robust estimation of the distance between the first and second groups of APs. However, in some examples, if only a single distance measurement between one AP in the first group of APs and one AP in the second group of APs is available and/or reliable, that distance measurement can form sufficient basis to estimate the distance between the first group of APs and the second group of APs.

In some examples, the computing device may obtain accelerometer data received from each of a plurality of APs deployed at the site. The accelerometer data for each AP is indicative of, for example, whether the AP is deployed using a ceiling mount installation, a wall mount installation, or a floor mount installation. The computing device may perform the processes (800, 820) separately for ceiling mounted APs, wall mounted APs and/or floor mounted APs. In some examples, by separating APs based on accelerometer data, APs that are deployed using a ceiling mount installation on one floor of a multi-floor structure can be distinguished from APs that are deployed using a floor mount installation on the floor immediately above. Because in some examples the distance between two such deployed APs may not be within the tolerance of identifying a floor versus a ceiling mount (that is, the integer multiple of the distance between floors (height) may be the same for such APs, as described herein with respect to FIG. 7D), such APs may be erroneously re-assigned to the same AP group (and thus associated with the same floor number) rather than two different (but immediately adjacent) floor numbers. By distinguishing floor mounted APs from ceiling mounted APs based on accelerometer data, and/or also from wall mounted APs, the techniques of the disclosure increase the likelihood that individual APs are assigned to the correct group of APs and also that group(s) of APs will be assigned to the correct floor regardless of the installation technique (e.g., wall, ceiling, or floor) used for any of the individual APs.

Figure 9:
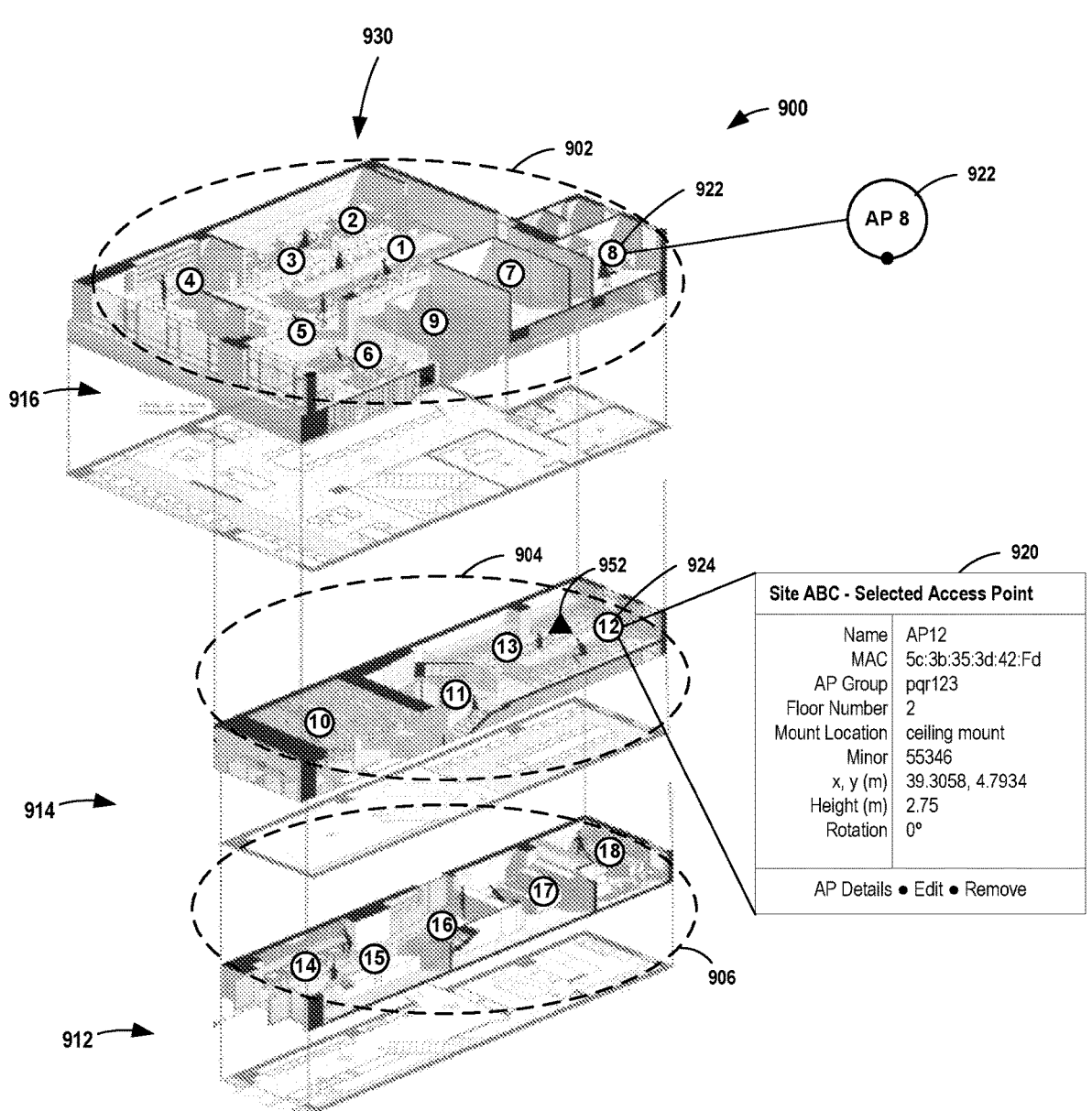
FIG. 9 is a screen shot of an example user interface including floor information for group(s) of APs, in accordance with one or more techniques of the disclosure.

FIG. 9 shows a screen shot of an example web page 900 including floor information for group(s) of APs that may be displayed on a user interface of a computing device, in accordance with one or more techniques of the disclosure. In some examples, automatic determination of floor information for one or more group(s) of APs is performed by, for example, NMS 130/300 executing AP floor determination module 346 as shown in FIGS. 3A-3B, as described herein.

Example web page 900 includes an example map 930 of a multi-floor structure corresponding to a site at which a plurality of APs are deployed to provide one or more wireless networks. The map 930 includes a multi-floor structure having three floors, a first floor 912, a second floor 914, and a third floor 916. The floors 912, 914 and 916 may be numbered as, for example, floor number 1, floor number 2, and floor number 3, respectively. However, any floor numbers may be assigned to the various floors, and the disclosure is not limited in this respect.

Each floor of the multi-floor structure is associated with a group of APs. In this example, floor 912 is associated with AP group 906, floor 914 is associated with AP group 904, and floor 916 is associated with AP group 902. AP group 902 includes APs A1-A9, AP group 904 includes APs A10-A13, and AP group 906 includes APs A14-A18.

Web page 900 includes one or more interactive user interface elements corresponding to each of the plurality of APs, here denoted AP1-AP18. For example, user interface element 922 corresponds to AP8 and user interface element 924 corresponds to AP12. Each user interface element 922, 924, etc. may include, for example, a rotatable virtual knob placed on map 930 such that user interface element reflects the location, orientation, and/or floor information of the corresponding AP with respect to the multi-floor structure. A small dot on the circumference of user interface element 922 may in some examples indicate the angle of orientation (e.g., rotation) of the respective AP.

In some examples, web page 900 may further include one or more interactive user interface elements, such as user interface element 952, corresponding to each of a plurality of wireless client devices present at the site. The wireless client devices may include mobile devices such as smart phones, tablet computers, etc., IoT devices such as printers, items of inventory, sensors, or equipment being tracked, sensors, etc., or any other type of wireless client device.

The computing device stores floor map data (e.g., floor map data 366 as shown in FIGS. 3C and 3D, for each of floors 912, 914, and 916. Although in FIG. 9 all three floors 912, 914, and 916 of the example multi-floor structure are shown, the computing device may generate, in response to receipt of a selection of one or more user interface elements input by a user, one or more other web pages that show only a single floor map for each individual floor and the group(s) of APs corresponding to that floor. For example, by clicking on a specific floor of the user interface 900, the system may display only a map of that specific floor number including the group(s) of APs associated with that specific floor number in their respective locations (e.g., x, y coordinate locations) and orientations.

As described herein, in accordance with one or more techniques of the disclosure, the computing device automatically determines floor information for one or more group(s) of APs. The determined floor information (including the specific floor number) for each group of APs may further be attributed to each of one or more APs in the group of APs. In this way, the computing device may determine a specific floor number on which each individual AP is deployed and/or generate for display on one or more web pages including the determined floor information for each individual AP. The user interface elements of the APs and/or the wireless devices (including mobile devices such as smart phones, tablet computers, etc., IoT devices such as printers, inventory items, or other items being tracked, etc.) are displayed on the map 930 at their respective floor number and their respective x, y coordinate locations.

For example, in response to receipt of a selection of a user interface element for a specific AP, the computing device may display information corresponding to the selected AP.

In FIG. 9, for example, in response to selection of user interface element 922 corresponding to AP 12, the computing device generates a text box or sub-window 920 including information corresponding to AP12 for display on a user computing device. Sub-window 920 may include, for example, the name of the AP (e.g., "AP12"), the MAC address of the AP, the name of the AP group with which the AP is associated (e.g., "pqr123"), the floor number with which the AP is associated (e.g., "2"), the mount location or type of mount for the AP (e.g., "ceiling mount"), the x, y coordinate location of the AP (e.g., "39.3058, 4.7934"), the height of the AP (e.g., "2.75 m"), and the rotation or orientation of the AP (e.g., "00").

In some examples, user interface elements representing the APs or group(s) of one or more APs may be color coded to indicate the status of the floor information for each AP or group of APs. For example, an AP or group of APs may be color coded with a first color to indicate that the floor information for those AP(s) or group of APs has not been determined. The anchor APs or anchor group of APs may be color coded a second color to visually identify the anchor APs or anchor group of one or more anchor APs from among the other APs at the site. Once the floor information for APs and/or group(s) of APs has been automatically determined, the APs and/or group(s) of APs may be color coded a third color to visually indicate that floor information for those AP(s) and/or group(s) of APs has been successfully automatically determined.

As another example, the computing device may analyze the locations, orientation and/or floor information of one or more of the plurality of APs or group(s) of APs at the site and generate a notification indicative of whether the deployment of APs at the site (in other words, the x, y coordinate locations at the site, the AP orientation and/or the specific floor numbers where the deployed APs are installed) is acceptable for purposes of wireless network performance. For example, the computing device may analyze the locations, orientation and/or floor information of one or more of the plurality of APs and/or groups of APs at the site and generate a notification informing a network administrator that the deployment is acceptable/successful, that the deployment was not successful and for what reason, that one or more of the APs should be moved to a different location (e.g., moved to a different x, y coordinate location on the same floor or moved to a different floor number), and/or that one or more APs should be added at a particular x, y coordinate location(s) on a specific floor number, etc., in order to optimize the wireless network at the site.

As another example, the computing device may analyze the locations, orientations and/or floor information of one or more of the plurality of APs and/or groups of APs at the site to automatically adjust one or more operating parameters (for example, the transmit power, channel selection, etc.) of one or more of the plurality of APs with respect to each other in order to optimize the wireless network at the site.

As another example, the computing device may analyze the locations, orientations and/or floor information of one or more of the plurality of APs at the site to determine a root cause(s) of poor network performance or an error condition, and/or to determine whether to automatically invoke a remedial action in response to determination of the root cause. The remedial action may be intended to address or alleviate the root cause and/or the symptoms of the root case. In addition or alternatively, the computing device may generate a notification indicative of the error condition, the root cause, and/or one or more suggested remedial actions that may be taken by a network administrator to address or alleviate the root cause(s).

As another example, the computing device may utilize the locations, orientations and/or floor information of one or more of the plurality of APs at the site to provide location services to one or more wireless client devices (e.g., smart phones, tablet computers, IoT devices, etc.) associated with the wireless network. The location services may include, for example, any one or more of mobile location, wayfinding, location-based proximity notifications, asset tracking, targeted advertising, any other location-aware applications, etc. The computing device may also provide location-based analytics to a network administrator or other user that derive insights from client mobility through the premises or other location-based information.

As another example, the computing device may provide a notification or alert to a technician when it detects that an AP was erroneously marked as being a member of a group of APs of a specific floor number and the computing device identifies that it is actually a member of a different group of APs (e.g., should be associated with a different floor number) The computing device may reassign the floor information to reflect the correct floor number and generate the notification or alert for informational purposes, to support training, for diagnostic or troubleshooting purposes, etc.

As other examples, the computing device may further monitor and/or utilize the locations, orientation and/or floor information of one or more of the plurality of APs or group(s) of APs at the site for the purposes of wireless network installation, optimization, troubleshooting, diagnostics, and any other network monitoring and management functions.

Figure 10A:
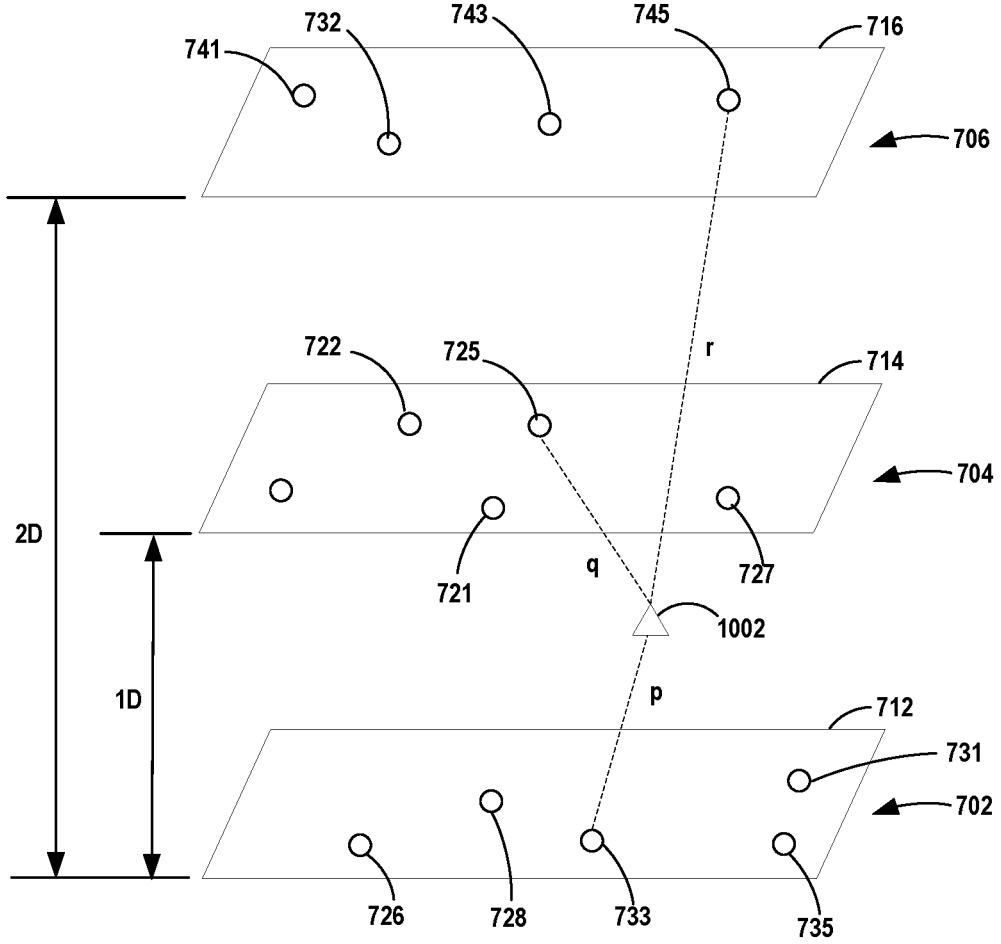
FIGS. 10A-10B are conceptual diagrams illustrating examples of estimating a distance between a wireless client device and one or more groups of APs, in accordance with one or more techniques of the disclosure.
Figure 10A:
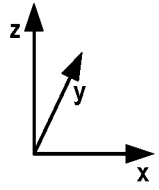
Figure 10B:
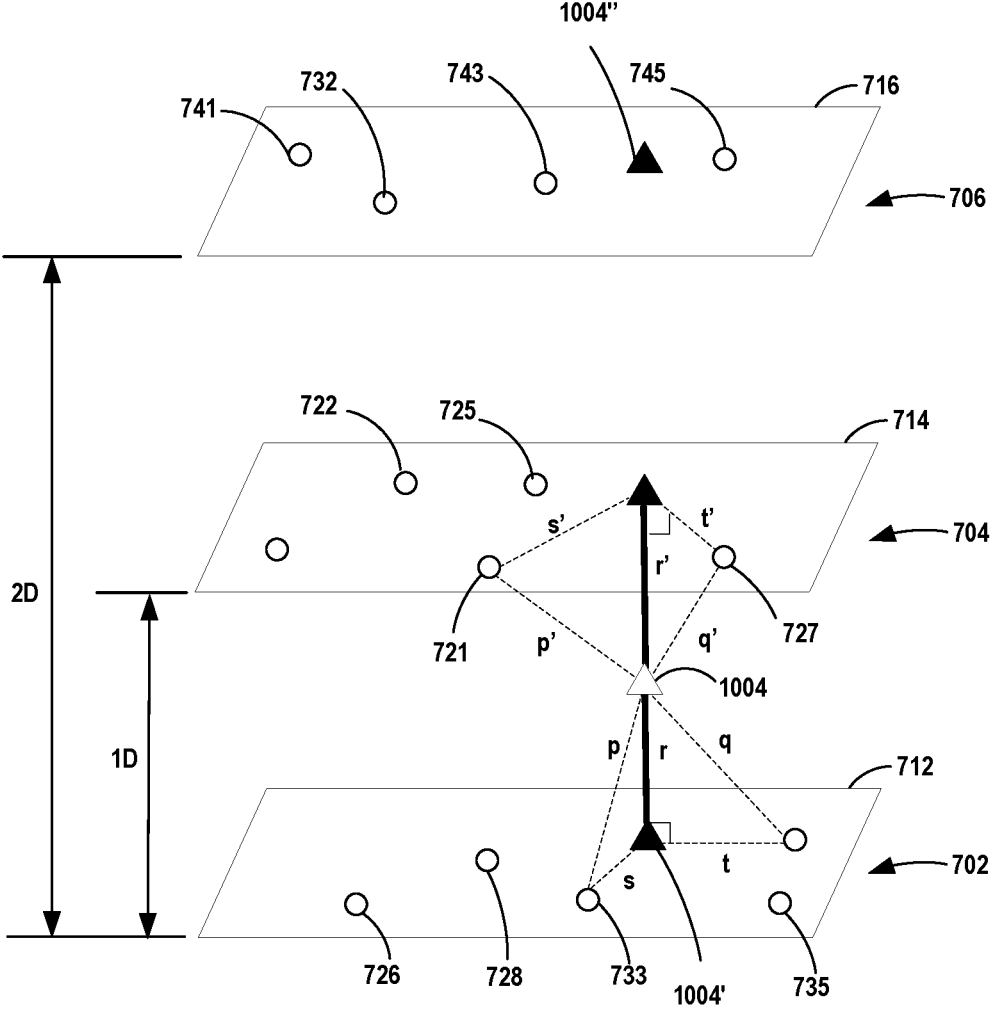
Figure 10B:
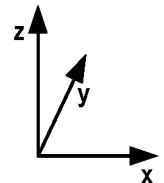

FIGS. 10A and 10B are conceptual diagrams illustrating examples of estimating a distance between a wireless client device and one or more groups of APs, in accordance with one or more techniques of the disclosure. The same or similar techniques as described above with respect to determining floor information for groups of APs may be further applicable to determining a floor number of a multi-floor structure on which a wireless client device is present. For example, once floor information for each group of APs deployed at a site is determined, a computing device may determine the floor on which a wireless client device (e.g., Wi-Fi client) is present by estimating distances (e.g., using RTT and/or RSSI techniques) between the client device and one or more APs associated with different groups of APs at the site. The relative position or location of the wireless client device with respect to the APs and/or groups of APs at the site may thus be determined, and in this way the computing device may determine the specific floor number on which the wireless mobile device is present. Thus, although the examples of the disclosure are discussed with respect to determining the floor information of one or more APs or one or more groups of APs, those skilled in the art should recognize that at least one the references to AP can be replaced with any other wireless device such as a wireless client device (e.g., Wi-Fi client). Once a specific floor of each AP group is determined, the same technology can, and often is, used to determine a specific floor on which a new AP is installed or the specific floor on which a wireless client device is located, for example as described herein with respect to FIGS. 10A and 10B. This is one example of how techniques of the disclosure help support provision of highly accurate location services for wireless devices associated with a wireless network.

For example, FIG. 10A, shows the same AP groups 702, 704 and 706 as described above with respect to FIG. 7B. A wireless client device 1002 is present at the site. To determine a floor number of the wireless client device at the site, a computing device estimates a first distance (e.g., p) between the wireless client device and at least one AP (e.g., AP 733) in a first group of APs (e.g., 702) the first group of APs associated with a first floor number of the multi-floor structure. The computing device further estimates a second distance (e.g., q and/or r) between the wireless device and at least one AP (e.g., 725 and/or 745) in a second group of APs (e.g., 704 and/or 706), the second group of APs associated with a second floor number of the multi-floor structure. The computing device determines a third floor number of the multi-floor structure corresponding to a location of the wireless device based on the estimated first and second distances and the first floor number associated with the first group of APs and the second floor number associated with the second group of APs. In the example of FIG. 10A, the computing device would determine that wireless client 1002 is located on the same floor number as AP group 704.

As another example, FIG. 10B shows the same AP groups 702, 704 and 706 as described above with respect to FIG. 7B. A wireless client device 1004 is present at the site. To determine a floor number of the wireless client device 1004 at the site, a computing device estimates a first distance (e.g., r) between the wireless client device and a first group of APs (e.g., 702) the first group of APs associated with a first floor number of the multi-floor structure. The computing device further estimates a second distance (e.g., r' for group 704)) between the wireless device and a second group of APs (e.g., 704 and/or 706), the second group of APs associated with a second floor number of the multi-floor structure. The computing device determines a third floor number of the multi-floor structure corresponding to a location of the wireless device based on the estimated first and second distances and the first floor number associated with the first group of APs and the second floor number associated with the second group of APs. In the example of FIG. 10A, the computing device would determine that wireless client 1004 is located on the same floor number as AP group 704.

In some examples, the computing device estimates the first distance between the wireless device and the first group of APs based on a first distance measurement between the wireless device and at least one AP in the first group of APs and coordinate locations of the wireless device and the at least one AP the first group of APs. The first distance measurement includes at least one of a round trip time (RTT) measurement between the wireless device and the at least one AP in the first group of APs and a received signal strength indicator (RSSI) measurement between the wireless device and the at least one AP in the first group of APs. Similar measurements may be made with respect to any AP of the plurality of APs at the site.

The computing device may further generate, for display on a user interface, a map of the multi-floor structure including one or more user interface elements each uniquely corresponding to one of the plurality of APs and further including a user interface element corresponding to the wireless device displayed on the map at the determined third floor number of the multi-floor structure and the coordinate location of the wireless device. For example, the computing device may generate a map such as that shown in FIG. 9 including a user interface element, such as user interface element 952, corresponding to the floor number and coordinate location of the wireless client device.

The techniques of the disclosure provide one or more technical advantages and practical applications. For example, automatic determination of floor information for group(s) of one or more deployed access points (APs) can reduce costs and increase efficiency as compared to the time-consuming and error-prone manual process of deployment and provisioning of a wireless network. Significant labor savings can be realized as technicians need not manually determine and enter floor information for each individual AP into a database at the time of installation. The techniques also facilitate frequent automated and remote verification and/or correction of floor information for the APs, thus reducing the need to dispatch technicians to conduct periodic manual site surveys in order to maintain up to date floor information. The techniques further support more rapid and dynamic deployment and provisioning of wireless networks by automatically detecting when an AP has been removed, one or more APs have been moved to a different floor of the multi-floor structure, or a new AP has been installed, e.g., as a replacement for a faulty AP or to provide additional wireless coverage. Automatic determination of floor information for group(s) of APs further supports the provision of highly precise indoor location-based services at a site, which depend upon accurate knowledge of the floor number on which each AP is installed. Targeted information can thus be provided to wireless devices based on their real-time or near real-time geographic location (including the specific floor location or number) in multi-floor indoor and/or outdoor environments. Automatic determination of floor information for group(s) of APs may further be used for RF coverage optimization and radio resource management of the APs at the site, such as channel and transmit power level selection, thus supporting optimization of network performance and improving the overall user experience of the wireless network.

The techniques described herein may be implemented using software, hardware and/or a combination of software and hardware. Various examples are directed to apparatus, e.g., mobile nodes, mobile wireless terminals, base stations, e.g., access points, communications system. Various examples are also directed to methods, e.g., method of controlling and/or operating a communications device, e.g., wireless terminals (UEs), base stations, control nodes, access points and/or communications systems. Various examples are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of example approaches. Based upon design preferences, it is understood that the specific order or hierarchy of steps in the processes may be rearranged while remaining within the scope of the present disclosure. The accompanying method claims present elements of the various steps in a sample order and are not meant to be limited to the specific order or hierarchy presented.

In various examples devices and nodes described herein are implemented using one or more modules to perform the steps corresponding to one or more methods, for example, signal generation, transmitting, processing, and/or receiving steps. Thus, in some examples various features are implemented using modules. Such modules may be implemented using software, hardware or a combination of software and hardware. In some examples each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various examples are directed to a machine-readable medium e.g., a non-transitory computer readable medium, including machine executable instructions for causing a machine, e.g., processor and associated hardware, to perform one or more of the steps of the above-described method(s). Some examples are directed to a device including a processor configured to implement one, multiple, or all of the steps of one or more methods of the one example aspect.

In some examples, the processor or processors, e.g., CPUs, of one or more devices, e.g., communications devices such as wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all examples are directed to a communications device, e.g., user equipment, with a processor which includes a module corresponding to each of the steps of the various described methods performed by the device in which the processor is included. In some but not all examples a communications device includes a module corresponding to each of the steps of the various described methods performed by the device in which the processor is included. The modules may be implemented purely in hardware, e.g., as circuits, or may be implemented using software and/or hardware or a combination of software and hardware.

Some examples are directed to a computer program product comprising a computer-readable medium comprising code for causing a computer, or multiple computers, to implement various functions, steps, acts and/or operations, e.g. one or more steps described above. In some examples, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some examples are directed to a processor configured to implement one or more of the various functions, steps, acts and/or operations of one or more methods described above.

Accordingly, some examples are directed to a processor, e.g., CPU, graphical processing unit (GPU), digital signal processing (DSP) unit, etc., configured to implement some or all of the steps of the methods described herein. The processor may be for use in, e.g., a communications device or other device described in the present application.

Numerous additional variations on the methods and apparatus of the various examples described above will be apparent to those skilled in the art in view of the above description. Such variations are to be considered within the scope of this disclosure. The methods and apparatus may be, and in various examples are, used with BLE, LTE, CDMA, orthogonal frequency division multiplexing (OFDM), and/or various other types of communications techniques which may be used to provide wireless communications links between access nodes and mobile nodes. In some examples the access nodes are implemented as base stations which establish communications links with user equipment devices, e.g., mobile nodes, using OFDM and/or CDMA. In various examples the mobile nodes are implemented as notebook computers, personal data assistants (PDAs), or other portable devices including receiver/transmitter circuits and logic and/or routines, for implementing the methods.

In the detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Some examples may be used in conjunction with various devices and systems, for example, a User Equipment (UE), a Mobile Device (MD), a wireless station (STA), a wireless terminal (WT), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some examples may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications-Amendment 4: Enhancements for Very High Throughput for Operation in Bands below 6 GHz", December 2013); IEEE 802.11ad ("IEEE P802.11ad-2012, IEEE Standard for Information Technology-Telecommunications and Information Exchange Between Systems—Local and Metropolitan Area Networks—Specific Requirements—Part 11: Wireless LAN Medium Access Control (MAC) and Physical Layer (PHY) Specifications-Amendment 3:

Enhancements for Very High Throughput in the 60 GHz Band", 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 (i.e., IEEE 802.11mc) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some examples may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some examples may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other examples may be used in various other devices, systems and/or networks.

Some demonstrative examples may be used in conjunction with a WLAN (Wireless Local Area Network), e.g., a Wi-Fi network. Other examples may be used in conjunction with any other suitable wireless communication network, for example, a wireless area network, a "piconet", a WPAN, a WVAN, and the like.

Some examples may be used in conjunction with a wireless communication network communicating over a frequency band of 2.4 Ghz, 5 GHz and/or 60 GHz. However, other examples may be implemented utilizing any other suitable wireless communication frequency band(s), for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible. Moreover, the technology is not limited to any specific channels, but is generally applicable to any frequency range(s)/channel(s). Moreover, and as discussed, the technology may be useful in the unlicensed spectrum.

Although examples are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although examples are not limited in this regard, the terms "plurality" and "a plurality" as used herein may include, for example, "multiple" or "two or more." The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The examples have been described in relation to communications systems, as well as protocols, techniques, means and methods for performing communications, such as in a wireless network, or in general in any communications network operating using any communications protocol(s). Examples of such are home or access networks, wireless home networks, wireless corporate networks, and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the examples illustrated herein show various components of the system collocated, it is to be appreciated that the various components of the system can be located at distant portions of a distributed network, such as a communications network, node, within a Domain Master, and/or the Internet, or within a dedicated secured, unsecured, and/or encrypted system and/or within a network operation or management device that is located inside or outside the network. As an example, a Domain Master can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, a transceiver(s), a station, an access point(s), or some combination thereof. Similarly, one or more of the functional portions of the system could be distributed between a transceiver and an associated computing device/system.

Furthermore, it should be appreciated that the various links, including any communications channel(s)/elements/ lines connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the examples described herein are directed toward a transmitter portion of a transceiver performing certain functions, or a receiver portion of a transceiver performing certain functions, this disclosure is intended to include corresponding and complementary transmitter-side or receiver-side functionality, respectively, in both the same transceiver and/or another transceiver(s), and vice versa.

The examples are described in relation to enhanced communications. However, it should be appreciated, that in general, the systems and methods herein will work equally well for any type of communication system in any environment utilizing any one or more protocols including wired communications, wireless communications, powerline communications, coaxial cable communications, fiber optic communications, and the like.

The example systems and methods are described in relation to IEEE 802.11 and/or Bluetooth® and/or Bluetooth® Low Energy transceivers and associated communication hardware, software and communication channels. However, to avoid unnecessarily obscuring the present disclosure, the following description omits well-known structures and devices that may be shown in block diagram form or otherwise summarized.

While the above-described flowcharts have been discussed in relation to a particular sequence of events, it should be appreciated that changes to this sequence can occur without materially effecting the operation of the example(s). Additionally, the example techniques illustrated herein are not limited to the specifically illustrated examples but can also be utilized with the other examples and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, IEEE 802.11mc, Wi-Fi, LTE, 4G, Bluetooth®, WirelessHD, WiGig, WiGi, 3GPP, Wireless LAN, WiMAX, DensiFi SIG, Unifi SIG, 3GPP LAA (licensed-assisted access), and the like.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the examples is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed techniques may be readily implemented in software and/or firmware that can be stored on a storage medium to improve the performance of a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that there have at least been provided systems and methods for enhancing and improving conversational user interface. Many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A system comprising:

a plurality of access point devices (APs) configured to provide a wireless network at a site, wherein the site includes a multi-floor structure; and a network management system comprising:

one or more processors; and memory comprising instructions that when executed by the one or more processors cause the one or more processors to:

estimate, for each group of APs of a plurality of groups of APs, at least a first distance between a corresponding group of APs and a first other group of APs of the plurality of groups of APs based on a first distance measurement between at least one AP in the corresponding group of APs and at least one AP in the first other group of APs, and a second distance between the corresponding group of APs and a second other group of APs of the plurality of groups of APs based on a second distance measurement between at least one AP in the corresponding group of APs and at least one AP in the second other group of APs, wherein each group of APs includes one or more APs of the plurality of APs that are deployed on a corresponding floor of the multi-floor structure;

determine, based on at least the estimated first distance and second distance for each group of APs of the plurality of groups of APs, a relative order of the plurality of groups of APs; and assign, based on the relative order of the plurality of groups of APs, a floor number of a plurality of floor numbers of the multi-floor structure to each group of APs of the plurality of groups of APs.

2. The system of claim 1, wherein the first distance measurement between the at least one AP in the corresponding group of APs and the at least one AP in the first other group of APs is based on at least one of a round trip time (RTT) measurement between the at least one AP in the corresponding group of APs and the at least one AP in the first other group of APs or a received signal strength indicator (RSSI) measurement between the at least one AP in the corresponding group of APs and the at least one AP in the first other group of APs.

3. The system of claim 1, wherein to estimate at least the first distance between the corresponding group of APs and the first other group of APs, the instructions further cause the one or more processors to estimate at least the first distance between the corresponding group of APs and the first other group of APs based on coordinate locations of the at least one AP in the corresponding group of APs and the at least one AP in the first other group of APs, wherein the coordinate locations include x, y coordinate locations of the at least one AP in the corresponding group of APs and the at least one AP in the first other group of APs in a global coordinate system associated with the site.

4. The system of claim 1, wherein the memory further comprises instructions that when executed by the one or more processors cause the one or more processors to:

automatically invoke adjustment of at least one operating parameter of one or more APs of the plurality of APs based on the assignment of the floor number of the plurality of floor numbers of the multi-floor structure to each group of APs of the plurality of groups of APs.

5. The system of claim 1, wherein to assign the floor number of the plurality of floor numbers of the multi-floor structure to each group of APs of the plurality of groups of APs, the instructions further cause the one or more processors to:

assign the floor number of the plurality of floor numbers of the multi-floor structure to each group of APs of the plurality of groups of APs based on a defined floor number assigned to an anchor group of APs of the plurality of groups of APs.

6. The system of claim 5, wherein the defined floor number assigned to the anchor group of APs of the plurality of groups of APs is one of a lowest floor number of the multi-floor structure or a highest floor number of the multi-floor structure.

7. The system of claim 5, wherein when the multi-floor structure includes an even number of floors, the defined floor number assigned to the anchor group of APs of the plurality of groups of APs is any floor number of the multi-floor structure, and wherein when the multi-floor structure includes an odd number of floors, the defined floor number assigned to the anchor group of APs of the plurality of groups of APs is any floor number of the multi-floor structure except for a center-most floor number of the multi-floor structure.

8. The system of claim 1, wherein to assign the floor number of the plurality of floor numbers of the multi-floor structure to each group of APs of the plurality of groups of APs, the instructions further cause the one or more processors to:

assign the floor number of the plurality of floor numbers of the multi-floor structure to each group of APs of the plurality of groups of APs based on barometric pressure data associated with the at least one AP in the corresponding group of APs, the at least one AP in a second the first other group of APs, and the at least one AP in the second other group of APs.

9. The system of claim 1, wherein the memory further comprises instructions that when executed by the one or more processors cause the one or more processors to:

generate, for display on a user interface, a map of the multi-floor structure associated with the site, wherein the map includes one or more user interface elements corresponding to the plurality of APs and displayed on the map at assigned floor numbers.

10. A method comprising:

estimating, by the computing device, for each group of access point devices (AP) of a plurality of groups of APs, a first distance between a corresponding group of APs and a first other group of APs of the plurality of groups of APs based on a first distance measurement between at least one AP in the corresponding group of APs and at least one AP in the first other group of APs, and a second distance between the corresponding group of APs and a second other group of APs of the plurality of groups of APs based on a second distance measurement between at least one AP in the corresponding group of APs and at least one AP in the second other group of APs, wherein each group of APs includes one or more APs of the plurality of APs that are deployed on a corresponding floor of a multi-floor structure;

determining, by the computing device and based on at least the estimated first distance and second distance for each group of APs of the plurality of groups of APs, a relative order of the plurality of groups of APs; and assigning, by the computing device and based on the relative order of the plurality of groups of APs, a floor number of a plurality of floor numbers of the multi-floor structure to each group of APs of the plurality of groups of APs.

11. The method of claim 10, wherein the first distance measurement is based on at least one of a round trip time (RTT) measurement between the at least one AP in the corresponding group of APs and the at least one AP in the first other group of APs or a received signal strength indicator (RSSI) measurement between the at least one AP in the corresponding group of APs and the at least one AP in the first other group of APs.

12. The method of claim 10, wherein estimating at least the first distance between the corresponding group of APs and the first other group of APs comprises estimating at least the first distance between the corresponding group of APs and the first other group of APs based on coordinate locations of the at least one AP in the corresponding group of APs and the at least one AP in the first other group of APs, wherein the coordinate locations include X, y coordinate locations of the at least one AP in the corresponding group of APs and the at least one AP in the first other group of APs in a global coordinate system associated with the site.

13. The method of claim 10, wherein assigning the floor number of the plurality of floor numbers of the multi-floor structure to each group of APs of the plurality of groups of APs comprises:

assigning the floor number of the plurality of floor numbers of the multi-floor structure to each group of APs of the plurality of groups of APs based on a defined floor number assigned to an anchor group of APs of the plurality of groups of APs.

14. The method of claim 13, wherein the defined floor number assigned to the anchor group of APs of the plurality of groups of APs is one of a lowest floor number of the multi-floor structure or a highest floor number of the multi-floor structure.

15. The method of claim 14, wherein when the multi-floor structure includes an even number of floors, the defined floor number assigned to the anchor group of the plurality of groups is any floor number of the multi-floor structure, and wherein when the multi-floor structure includes an odd number of floors, the defined floor number assigned to the anchor group of the plurality of groups is any floor number of the multi-floor structure except for the middle floor number of the multi-floor structure.

16. The method of claim 10, wherein assigning the floor number of the plurality of floor numbers of the multi-floor structure to each group of APs of the plurality of groups of APs comprises:

assigning the floor number of the plurality of floor numbers of the multi-floor structure to each group of APs of the plurality of groups of APs based on barometric pressure data associated with the at least one AP in the corresponding group of APs, the at least one AP in the first other group of APs, and the at least one AP in the second other group of APs.

17. The method of claim 10, further comprising:

generating, for display on a user interface, a map of the multi-floor structure associated with the site, wherein the map includes one or more user interface elements corresponding to the plurality of APs and displayed on the map at assigned floor numbers.

18. Non-transitory computer readable media comprising instructions that when executed by one or more processors cause the one or more processors to:

estimate, for each group of access point devices (APs) of a plurality of groups of APs, at least a first distance between a corresponding group of APs and a first other group of the plurality of groups of APs based on a first distance measurement between at least one AP in the corresponding group of APs and at least one AP in the first other group of APs, and a second distance between the corresponding group of APs and a second other group of APs of the plurality of groups of APs based on a second distance measurement between at least one AP in the corresponding group of APs and at least one AP in the second other group of APs, wherein each group of APs includes one or more APs deployed on a corresponding floor of a multi-floor structure;

determine, based on the estimated distances, a relative order of the plurality of groups of APs; and assign, based on the relative order of the plurality of groups of APs, a floor number of a plurality of floor numbers of the multi-floor structure to each group of APs of the plurality of groups of APs.

* * * * *